(12) United States Patent
Wang et al.

(10) Patent No.: US 12,470,505 B2
(45) Date of Patent: Nov. 11, 2025

(54) MESSAGE PROCESSING METHOD AND APPARATUS, DEVICE, STORAGE MEDIUM, AND PROGRAM PRODUCT

(71) Applicant: Tencent Technology (Shenzhen) Company Limited, Guangdong (CN)

(72) Inventors: Liyun Wang, Shenzhen (CN); Rui Han, Shenzhen (CN); Renjun Zheng, Shenzhen (CN); Tingting Li, Shenzhen (CN); Jinyang Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 181 days.

(21) Appl. No.: 17/991,455

(22) Filed: Nov. 21, 2022

(65) Prior Publication Data
US 2023/0088720 A1 Mar. 23, 2023

Related U.S. Application Data

(63) Continuation of application No. PCT/CN2022/086271, filed on Apr. 12, 2022.

(30) Foreign Application Priority Data

May 19, 2021 (CN) .......................... 202110546504.3

(51) Int. Cl.
*G06F 21/00* (2013.01)
*G06F 21/62* (2013.01)
*H04L 51/063* (2022.01)

(52) U.S. Cl.
CPC ........ *H04L 51/063* (2013.01); *G06F 21/6209* (2013.01)

(58) Field of Classification Search
CPC ....... H04L 51/063; H04L 51/52; H04L 51/04; H04L 51/212; G06F 21/6209;
(Continued)

(56) References Cited

U.S. PATENT DOCUMENTS

2008/0301242 A1* 12/2008 Akella ................. G06Q 10/107
709/206
2012/0011567 A1* 1/2012 Cronk .............. H04N 21/25875
726/28
(Continued)

FOREIGN PATENT DOCUMENTS

CN 110262735 A 9/2019
CN 111368329 A * 7/2020 ......... G06F 21/6263
(Continued)

OTHER PUBLICATIONS

International Search Report and Written Opinion for priority application No. PCT/CN2022/086271 dated Jun. 16, 2022, in Chinese language, with English language translation of the International Search Report, 8p.

*Primary Examiner* — Michael M Lee
(74) *Attorney, Agent, or Firm* — Crowell & Moring LLP

(57) ABSTRACT

A message processing method can help protect confidential information, or other information that one desires not to disclose, from being disclosed, spread, or leaked, and improve the security of such protected information. A chat interface comprising at least one chat message is displayed. A target operation instruction is received that indicates a target operation that is to be executed on a target chat message. The target operation is executed in response to the target operation instruction. Protection processing on the protected content is performed when the target chat message includes a protected content, thereby protecting the information from being further disclosed and improving security of the information.

20 Claims, 22 Drawing Sheets

(58) Field of Classification Search
CPC .. G06F 3/0481; G06F 3/04817; G06F 3/0484; G06F 3/04847; G06F 9/451; G06F 21/602; G06F 21/6245
See application file for complete search history.

(56) References Cited

U.S. PATENT DOCUMENTS

| | | | |
|---|---|---|---|
| 2014/0047358 A1* | 2/2014 | Park | H04L 51/04 715/758 |
| 2016/0241530 A1* | 8/2016 | Andreev | H04L 63/083 |
| 2017/0118152 A1* | 4/2017 | Lee | G06F 16/345 |
| 2017/0293954 A1* | 10/2017 | Rosenberg | H04L 67/02 |
| 2017/0325171 A1* | 11/2017 | Xu | G06F 21/6209 |
| 2018/0063091 A1* | 3/2018 | Lancioni | H04L 63/205 |
| 2018/0295083 A1* | 10/2018 | Babu | G06F 21/6209 |
| 2018/0367484 A1* | 12/2018 | Rodriguez | H04L 67/75 |
| 2021/0126907 A1* | 4/2021 | Zang | G06Q 10/107 |

FOREIGN PATENT DOCUMENTS

| | | | | |
|---|---|---|---|---|
| CN | 111581664 A * | 8/2020 | | G06F 21/6263 |
| CN | 112035878 A | 12/2020 | | |
| CN | 112100041 A | 12/2020 | | |
| CN | 112306590 A | 2/2021 | | |
| WO | WO-2020063107 A1 * | 4/2020 | | G06F 3/04845 |
| WO | WO 2020/252951 A1 | 12/2020 | | |

\* cited by examiner

MESSAGE PROCESSING METHOD AND APPARATUS, DEVICE, STORAGE MEDIUM, AND PROGRAM PRODUCT

RELATED APPLICATION

This application claims priority as a continuation to PCT/CN2022/086271, filed on Apr. 12, 2022, which claims priority to Chinese Patent Application No. 202110546504.3, filed on May 19, 2021, each of which are incorporated herein by reference in their entirety.

FIELD OF THE TECHNOLOGY

This disclosure relates to the field of computer technology, and particularly to a message processing method and apparatus, a device, a non-transitory computer-readable storage medium, and a computer program product.

BACKGROUND OF THE DISCLOSURE

Many social applications provide users with an Internet-based instant messaging service that allows two or more people to instantly communicate with textual information, documents, images, voices, and videos over a network. As social applications have penetrated into people's everyday lives, more and more people use social applications to communicate.

In the process of communicating through a social application, some information that is confidential, not desired to be disclosed, or has an uncertain spread risk may be communicated accidentally or otherwise leaked.

SUMMARY

Embodiments of this disclosure provide a message processing method and apparatus, a device, a non-transitory computer-readable storage medium, and a computer program product, which may prevent confidential information or content from being spread and leaked, and improve the security of the confidential information or other content.

Some embodiments of this disclosure provide a message processing method, including:
  displaying a chat interface comprising at least one chat message;
  receiving, on the chat interface, a target operation instruction for instructing a target operation to be executed on a target chat message, the target operation being used for sharing the target chat message; and
  executing the target operation on the target chat message in response to the target operation instruction, and performing, when the target chat message comprises a protected content, protection processing on the protected content in an execution result of the target chat message.

Some embodiments of this disclosure provide a message processing method, including:
  displaying a privacy protection control on a chat interface; and
  setting, in response to a transmission instruction for a target chat message on the chat interface when the privacy protection control is on, a content of the target chat message as a protected content, and transmitting the target chat message; and
  transmitting, in response to a transmission instruction for a target chat message on the chat interface when the privacy protection control is off, the target chat message, displaying the target chat message on the chat interface, and setting a content of the target chat message as a protected content in response to receiving a protection setting instruction for the target chat message,
  protection processing being performed on the protected content in an execution result of the protected content when a target operation instruction for instructing a target operation to be executed on the protected content is triggered at a receiving end.

Some embodiments of this disclosure provide a message processing apparatus, including:
  a display module, configured to display a chat interface including at least one chat message;
  a receiving module, configured to receive, on the chat interface, a target operation instruction for instructing a target operation to be executed on a target chat message, the target operation being used for sharing the target chat message; and
  a processing module, configured to execute the target operation on the target chat message in response to the target operation instruction, and perform, when the target chat message includes a protected content, protection processing on the protected content in an execution result of the target chat message.

Some embodiments of this disclosure provide a message processing apparatus, including:
  a display module, configured to display a privacy protection control on a chat interface; and
  a first transmission module, configured to set, in response to a transmission instruction for a target chat message on the chat interface when the privacy protection control is on, a content of the target chat message as a protected content, and transmit the target chat message; or
  a second transmission module, configured to transmit, in response to a transmission instruction for a target chat message on the chat interface when the privacy protection control is off, the target chat message, display the target chat message on the chat interface, and set a content of the target chat message as a protected content in response to receiving a protection setting instruction for the target chat message,
  protection processing being performed on the protected content in an execution result of the protected content when a target operation instruction for instructing a target operation to be executed on the protected content is triggered at a receiving end.

Some embodiments of this disclosure provide a computer device, including:
  a memory, configured to store executable instructions; and
  a processor, configured to implement, when executing the executable instructions stored in the memory, the message processing method provided in the embodiments of this disclosure.

The embodiments of this disclosure provide a non-transitory computer-readable storage medium, storing executable instructions, configured to implement, when executed by a processor, the message processing method provided in the embodiments of this disclosure.

Some embodiments of this disclosure provide a computer program product, including a computer program or an instruction, the computer program or the instruction implementing, when executed by a processor, the message processing method provided in the embodiments of this disclosure.

Some embodiments of this disclosure have the following beneficial effects:

In some examples, a target operation is executed on a target chat message in response to a target operation instruction, and protection processing is performed, when the target chat message includes a protected content, on the protected content in an execution result of the target chat message. In this way, when the target chat message including the protected content is shared, protection processing is performed on the protected content, so that the protected content may be prevented from being spread and leaked, and the security of the protected content may be improved.

DESCRIPTION OF EMBODIMENTS

The objectives, technical solutions, and advantages of this are described in further detail with reference to the accompanying drawings. The following descriptions show and describe merely some embodiments of this disclosure. Additional embodiments may be understood in accordance with these accompanying drawings as within the scope of this disclosure.

In the following descriptions, "some embodiments" describe a subset of all possible embodiments. However, it may be understood that the "some embodiments" may be the same subset or different subsets of all the possible embodiments, and may be combined with each other without conflict.

In the following descriptions, the included term "first," "second" etc. is merely intended to distinguish similar objects but does not indicate a specific order of an object. It may be understood that "first," "second" etc. are interchangeable in terms of order or sequence if permitted, so that the embodiments of this disclosure described herein can be implemented in a variety of orders or sequences.

Unless otherwise defined, meanings of all technical and scientific terms used in this specification are the same as that usually understood by a person skilled in the art to which this disclosure belongs. Terms used in this specification are merely intended to describe objectives of the embodiments of this disclosure, but are not intended to limit this disclosure.

Before the embodiments of this disclosure are further described in detail, a description is made of some terms of this disclosure.

1) The expression "in response to" is used for representing a condition or a status on which a performed operation depends. When the condition or status is satisfied, the one or more performed operations may be real-time or may have a set delay. Unless explicitly stated, there is no limitation on the order in which the plurality of operations are performed.

2) Client: it is an application program running in a terminal for providing various services, such as a social client, an instant messaging client, a learning client, or a game client.

Figure 1:
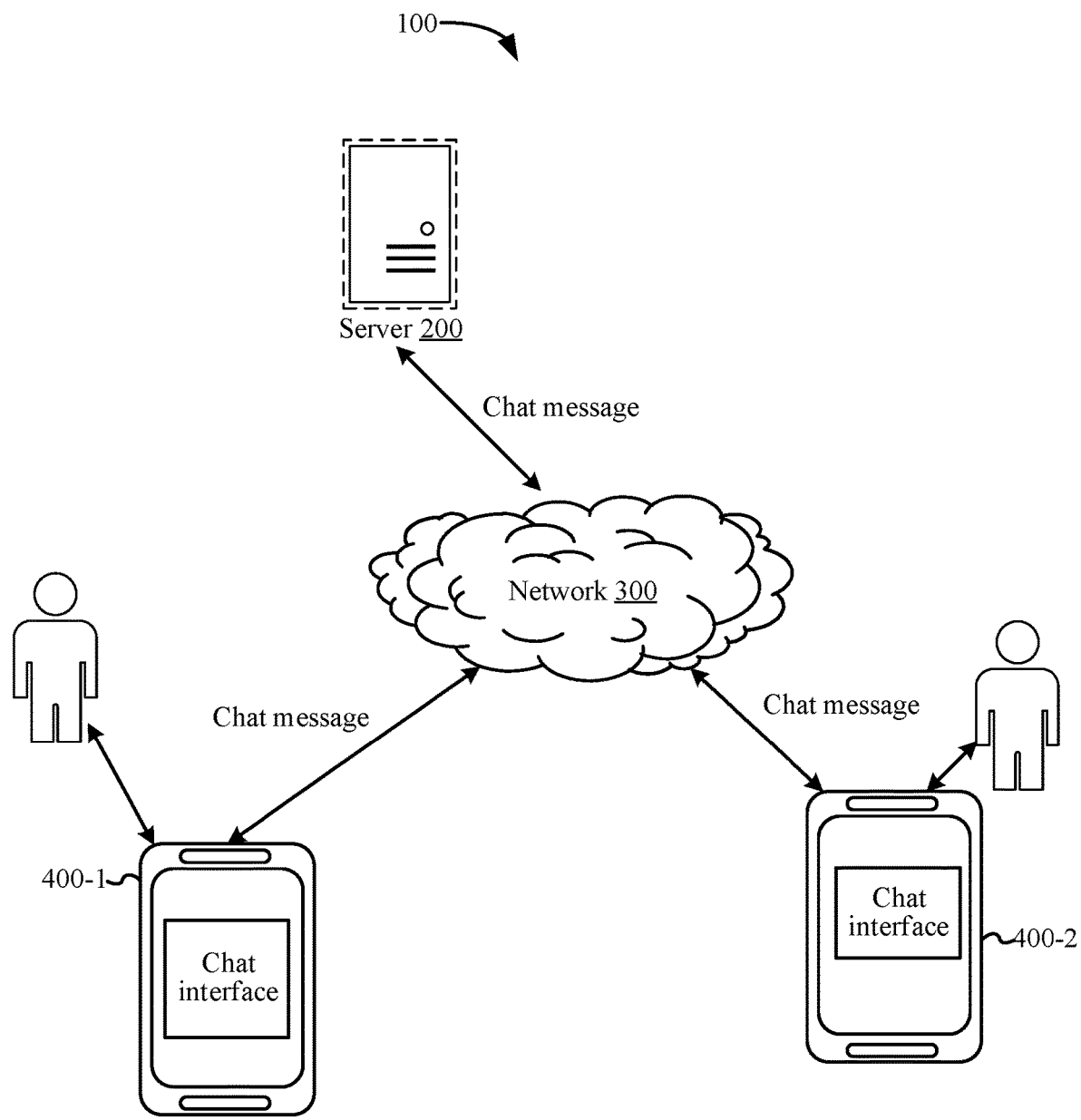
FIG. 1 is a schematic architectural diagram of an example data processing system 100 according to an embodiment of this disclosure.

FIG. 1 is an example schematic architectural diagram of a message processing system 100 according to an embodiment of this disclosure. Terminals (including a terminal 400-1 and a terminal 400-2) are connected with a server 200 through a network 300. The network 300 may be a wide area network, a local area network, or a combination thereof. A social client, such as an instant messaging client, may be set in the terminal. A user of the terminal 400-1 and a user of the terminal 400-2 may transmit chat messages through the social client for communication.

The terminal 400-1 is configured to transmit at least one chat message through a chat interface, and display the transmitted chat message on the chat interface, the at least one chat message including a protected content.

The server 200 is configured to receive the at least one chat message, and transmit the at least one chat message to the terminal 400-2.

The terminal 400-2 is configured to display a chat interface including the at least one chat message, receive, on the chat interface, a target operation instruction for instructing a target operation to be executed on a target chat message, the target operation being used for sharing the target chat message, execute the target operation on the target chat message in response to the target operation instruction, and perform, when the target chat message includes a protected content, protection processing on the protected content in an execution result of the target chat message.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal may be a smartphone, a tablet computer, a notebook computer, a desktop computer, a smart speaker, a smartwatch and the like, but is not limited thereto.

Figure 2:
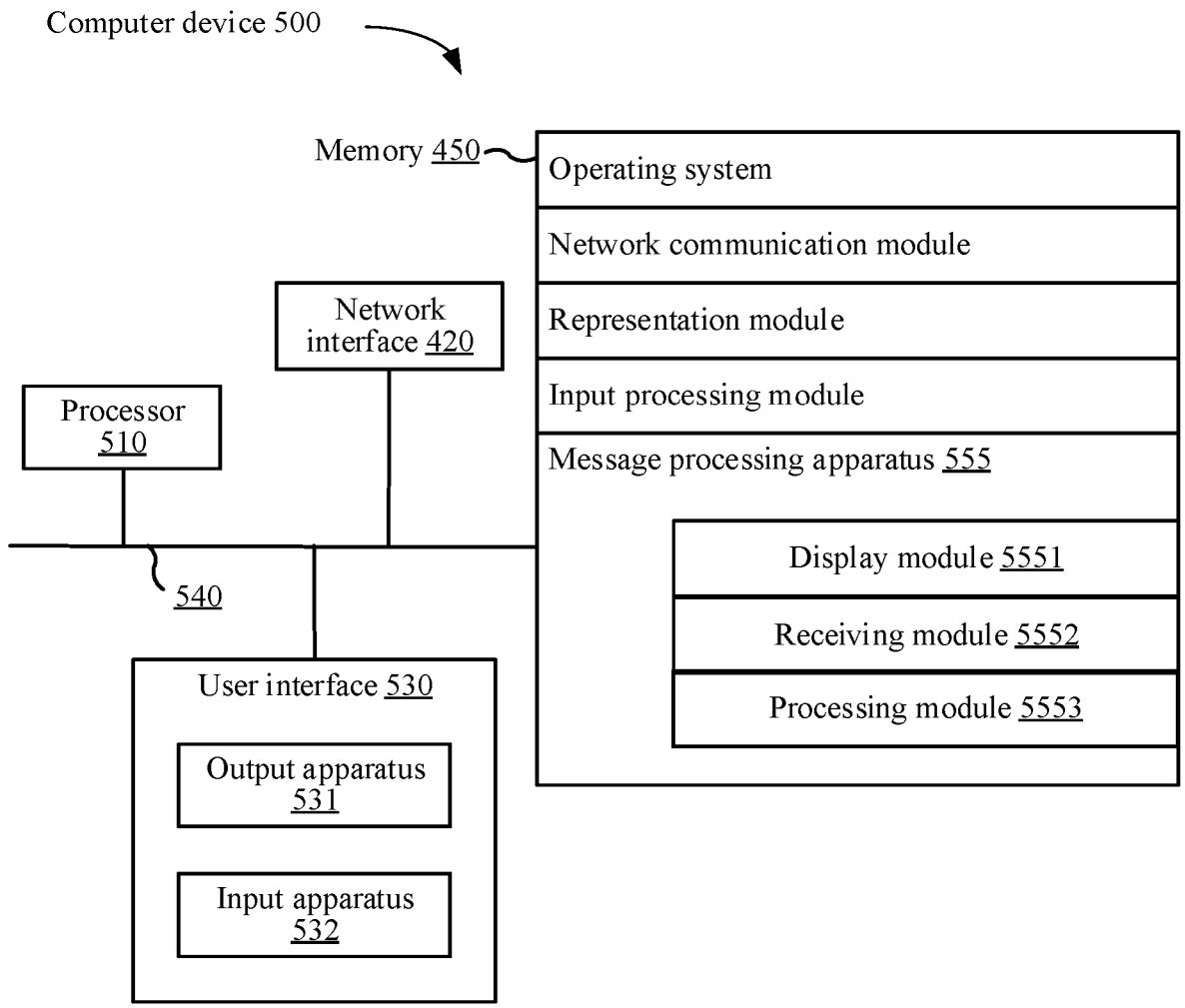
FIG. 2 is a schematic structural diagram of an example computer device 500 according to an embodiment of this disclosure.

Referring to FIG. 2, FIG. 2 is a schematic structural diagram of a computer device 500 according to an embodiment of this disclosure. In practical applications, the computer device 500 may be the terminal (such as the terminal 400-1 and the terminal 400-2) or server 200 in FIG. 1. The computer device implementing the message processing method in the embodiments of this disclosure is described taking the computer device being the terminal shown in FIG. 1 as an example. The computer device 500 shown in FIG. 2 includes: at least one processor 510, a memory 550, at least one network interface 520, and a user interface 530. All the components in the computer device 500 are coupled together through a bus system 540. The bus system 540 may be configured to implement connection and communication between the components. In addition to a data bus, the bus system 540 further includes a power bus, a control bus, and a status signal bus. However, for ease of clear description, all types of buses in FIG. 2 are marked as the bus system 540.

The processor 510 may be an integrated circuit chip having a signal processing capability, such as a general purpose processor, a digital signal processor (DSP), or another programmable logic device (PLD), discrete gate, transistor logical device, or discrete hardware component. The general purpose processor may be a microprocessor, any conventional processor, or the like.

The user interface 530 includes one or more output apparatuses 531 that can display media content, including one or more loudspeakers and/or one or more visual display screens. The user interface 530 further includes one or more input apparatuses 532, including user interface components that facilitate inputting of a user, such as a keyboard, a mouse, a microphone, a touch display screen, a camera, and another input button and control.

The memory 550 may be a removable memory, a non-removable memory, or a combination thereof. Example hardware devices include a solid-state memory, a hard disk drive, an optical disc driver, or the like. The memory 550 may include one or more storage devices physically away from the processor 510.

The memory 550 includes a volatile memory or a non-volatile memory, or may include both a volatile memory and a non-volatile memory. The non-volatile memory may be a read only memory (ROM). The volatile memory may be a random access memory (RAM). The memory 550 described includes any suitable type of memories.

In some embodiments, a message processing apparatus provided in the embodiments of this disclosure may be implemented by software. FIG. 2 shows a message processing apparatus 555 stored in the memory 550, which may be software in form of a program, a plug-in, etc., including the following software modules: a display module 5551, a receiving module 5552, and a processing module 5553. These modules are logical, and thus may be combined or further split arbitrarily according to functions to be realized. The following describes functions of the modules.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

In some other embodiments, the message processing apparatus provided in the embodiments of this disclosure may be implemented by using hardware. For example, the message processing apparatus provided in the embodiments of this disclosure may be a processor in a form of a hardware decoding processor, programmed to perform the message processing method provided in the embodiments of this disclosure. For example, the processor in the form of a hardware decoding processor may use one or more application specific integrated circuits (ASIC), a DSP, a programmable logic device (PLD), a complex programmable logic device (CPLD), a field-programmable gate array (FPGA), or other electronic components.

Figure 3:
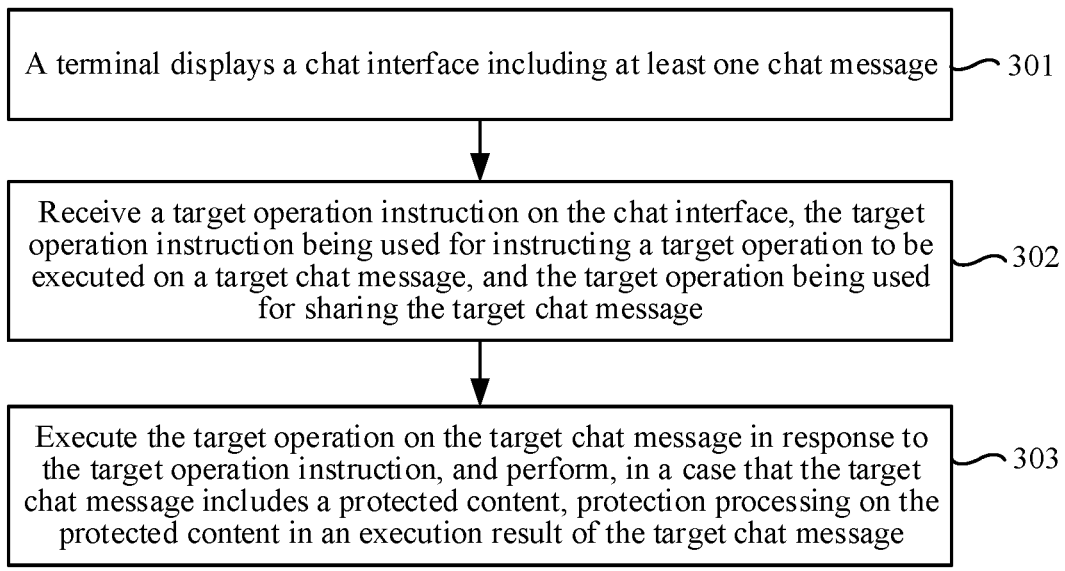
FIG. 3 is a schematic flowchart of an example message processing method according to an embodiment of this disclosure.

Referring to FIG. 3, FIG. 3 is a schematic flowchart of a message processing method according to an embodiment of this disclosure. Descriptions will be made in combination with the steps shown in FIG. 3.

Step 301: A terminal displays a chat interface including at least one chat message.

In some examples, a client is set in the terminal, such as an instant messaging client, a social client, a learning client, or a game client, a chat interface is displayed through the client, and a user may communicate with another user through the chat interface. The user may transmit a chat message or receive a chat message when communicating with the other user through the chat interface, and the transmitted chat message or the received chat message may be displayed on the chat interface.

Step 302: Receive a target operation instruction on the chat interface.

The target operation instruction is used for instructing a target operation to be executed on a target chat message. The target operation is used for sharing the target chat message. For example, the target operation may be a forwarding operation directly for sharing the target chat message by forwarding. Alternatively, the target operation may include a screen capturing operation and a sharing operation, and after an execution result (i.e., a screen capturing result) is obtained by the screen capturing operation, the execution result (i.e., the screen capturing result) is shared by the sharing operation. That is, the target operation is used for sharing the target chat message directly or indirectly.

In some examples, there may be one or more (two or more) target chat messages, and the user may select part or all of the chat messages as target chat messages according to displayed chat messages so as to trigger the target operation instruction for the target chat messages.

Step 303: Execute the target operation on the target chat message in response to the target operation instruction, and perform, when the target chat message includes a protected content, protection processing on the protected content in an execution result of the target chat message.

The protected content may be a certain target chat message or a partial content in a target chat message. In practical implementation, performing protection processing on the protected content may be blocking the protected content such that the protected content is non-browsable, or controlling the protected content to be inoperable, for example, controlling the protected content to be non-forwardable, or controlling the protected content to be non-copyable.

In some embodiments, the terminal may execute the target operation in the following manner: forwarding, in response to the target operation instruction when the target operation is a forwarding operation, the target chat message to a target object indicated by the forwarding operation instruction. Accordingly, the terminal may perform, when the target chat message includes the protected content, protection processing on the protected content in the execution result of the target chat message in the following manner: displaying the target chat message on a chat interface for a chat with the target object when the target chat message includes the protected content, and performing protection processing on the protected content in the target chat message.

The target operation may be a forwarding operation. In practical implementation, the user may first select a target chat message to be forwarded. The terminal displays a forwarding function item for the target chat message in response to the selection operation of the user. After receiving a triggering operation performed on the forwarding function item, the terminal may display one or more (two or more) user objects for the user to select. The user executes a selection operation performed on a target object in multiple user objects, and triggers a forwarding operation instruction for the target chat message so as to instruct the target chat message to be forwarded to the target object. Alternatively, after the terminal receives the triggering operation for the forwarding function item, the forwarding operation instruction for the target chat message may be triggered directly. The target object may be a pre-set user object, such as a user object selected by default.

In some examples, when the target chat message includes a protected content, the terminal may forward the target chat message to the target object indicated by the forwarding operation instruction in the following manner. A forwarding instruction for the target chat message is transmitted to a server, the forwarding instruction containing object information of the target object, the target chat message, and labeling information of the protected content. The server parses the forwarding instruction to obtain the target object, target chat message, and labeling information of the protected content in the forwarding instruction, performs protection processing on the protected content according to the labeling information, and transmits the target chat message subjected to protection processing to a terminal at the target object side. The terminal at the target object side performs protection processing on the protected content in the target chat message when displaying the target chat message. Therefore, the target object may not obtain the protected content in the target chat message, the protected content may be prevented from being spread and leaked, and the security of the protected content may be improved.

In some embodiments, the terminal may automatically display a chat interface for a chat with the target object after forwarding the target chat message to the target object indicated by the forwarding operation instruction. Alternatively, the terminal displays a chat interface for a chat with the target object after receiving a display instruction triggered by the user for the chat interface for the chat with the target object, displays the target chat message on the chat interface, and when the target chat message includes the protected content, performs protection processing on the protected content in the target chat message.

That is, the terminal displays the target chat message on the chat interface for the chat with the target object, and performs protection processing on the protected content in the target chat message. The terminal at the target object side also performs protection processing on the protected content in the target chat message when displaying the target chat message on a corresponding chat interface. That is, the target chat message displayed by the terminal at the target object side on the corresponding chat interface is a chat message whose protected content is subjected to protection processing.

Figure 4:
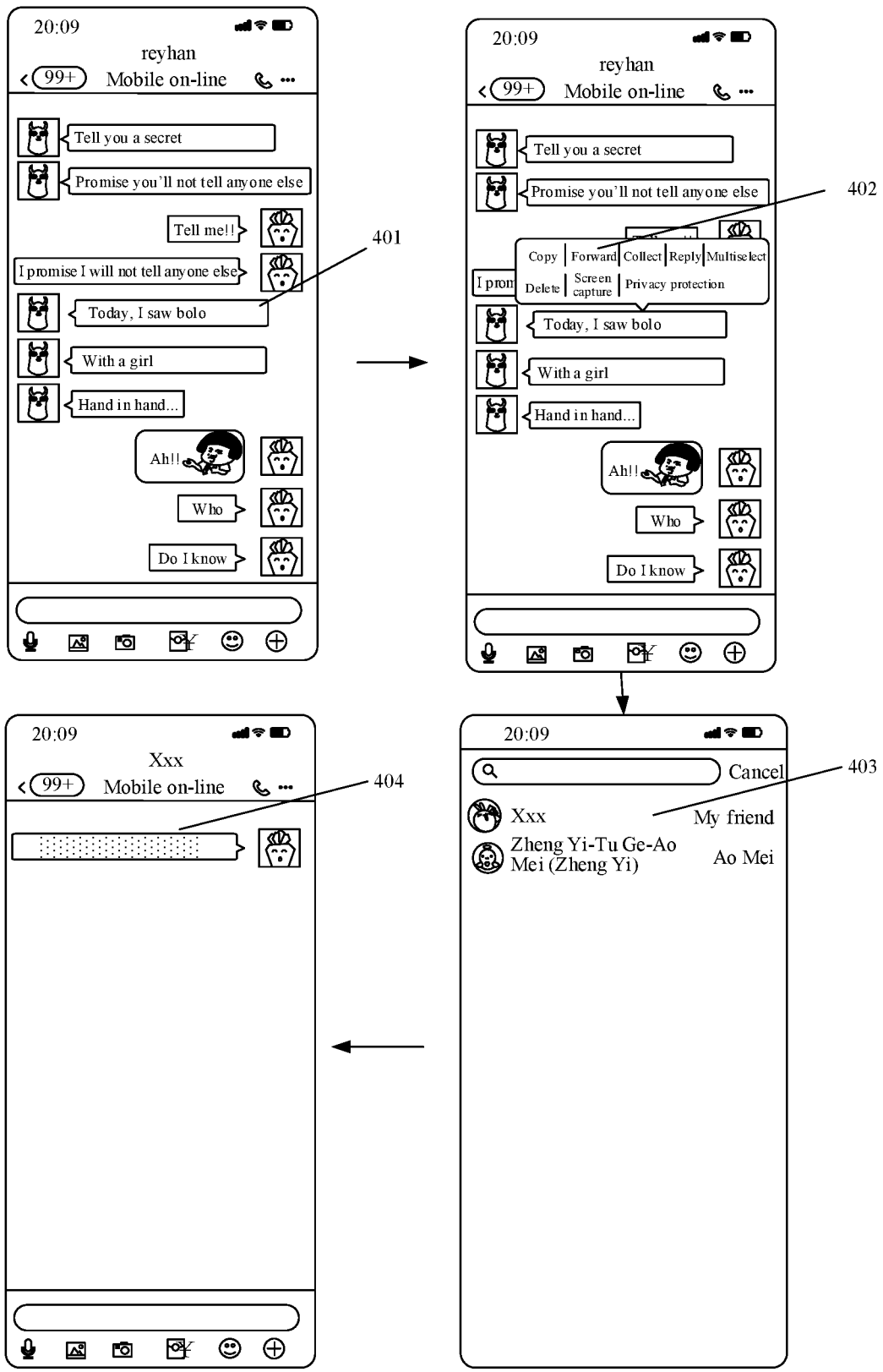
FIG. 4 is a schematic diagram of an example forwarding process of a target chat message according to an embodiment of this disclosure.

As an example, protection processing is hiding the protected content. FIG. 4 is a schematic diagram of a forwarding process of a target chat message according to an embodiment of this disclosure. Referring to FIG. 4, a chat interface including multiple chat messages is displayed. On this chat interface, a long-press operation performed on a target chat message 401 is received, and a toolbar corresponding to the target chat message 401 is displayed, including a forwarding button 402, the target chat message 401 being a protected content. Multiple selectable user objects are displayed when a triggering operation performed on the forwarding button 402 is received, such as a tap operation performed on the forwarding button 402. When a tap operation performed on a target object 403 is received, a target chat message is transmitted to the target object, and a chat interface for a chat with the target object is displayed, in which the target chat message is displayed, a content in the target chat message 404 being hidden.

In some embodiments, the terminal may execute the target operation in the following manner: performing, in response to the target operation instruction when the target operation is a screen capturing operation, screen capturing processing on a region including the target chat message to obtain a screenshot image including the target chat message. Accordingly, protection processing may be performed, when the target chat message includes the protected content, on the protected content in the execution result of the target chat message in the following manner: performing protection processing on the protected content in the screenshot image when the target chat message includes the protected content, and displaying a processed screenshot image.

In practical implementation, when the target operation is a screen capturing operation, the target operation instruction is a screen capturing operation instruction. The screen capturing operation instruction may be a shortcut-triggered screen capturing instruction. For example, the screen capturing operation instruction may be a screen capturing operation instruction triggered by the user by a three-finger swipe. Alternatively, the screen capturing operation instruction may be a screen capturing operation instruction triggered by triggering a shortcut key, and a screen capturing region corresponding to the screen capturing operation instruction is a whole mobile phone screen region. Alternatively, the screen capturing operation instruction may be a screen capturing operation instruction triggered by a screen capturing icon. The screen capturing operation instruction may select a screen capturing region. For example, the computer terminal displays the screen capturing icon, and when receiving a triggering operation performed on the screen capturing icon, enters a screen capturing state and displays a region selection focus. The user triggers a region selection operation based on the region selection focus. The terminal displays a screen capturing box corresponding to the region selection operation, the screen capturing box being used for indicating the selected screen capturing region, and when receiving screen capturing confirmation operation, performs screen capturing processing on the selected screen capturing region to obtain a screenshot image.

In some examples, the terminal obtains a screen capturing region corresponding to the screen capturing operation, determines a chat message in the screen capturing region as a target chat message, and detects whether the target chat message includes a protected content. When a detection result indicates that the target chat message includes the protected content, protection processing is performed on the protected content in the target chat message in the screenshot image, namely the protected content in the target chat message is not displayed. When the detection result indicates that the target chat message includes no protected content, all contents of the target chat message are displayed.

Figure 5:
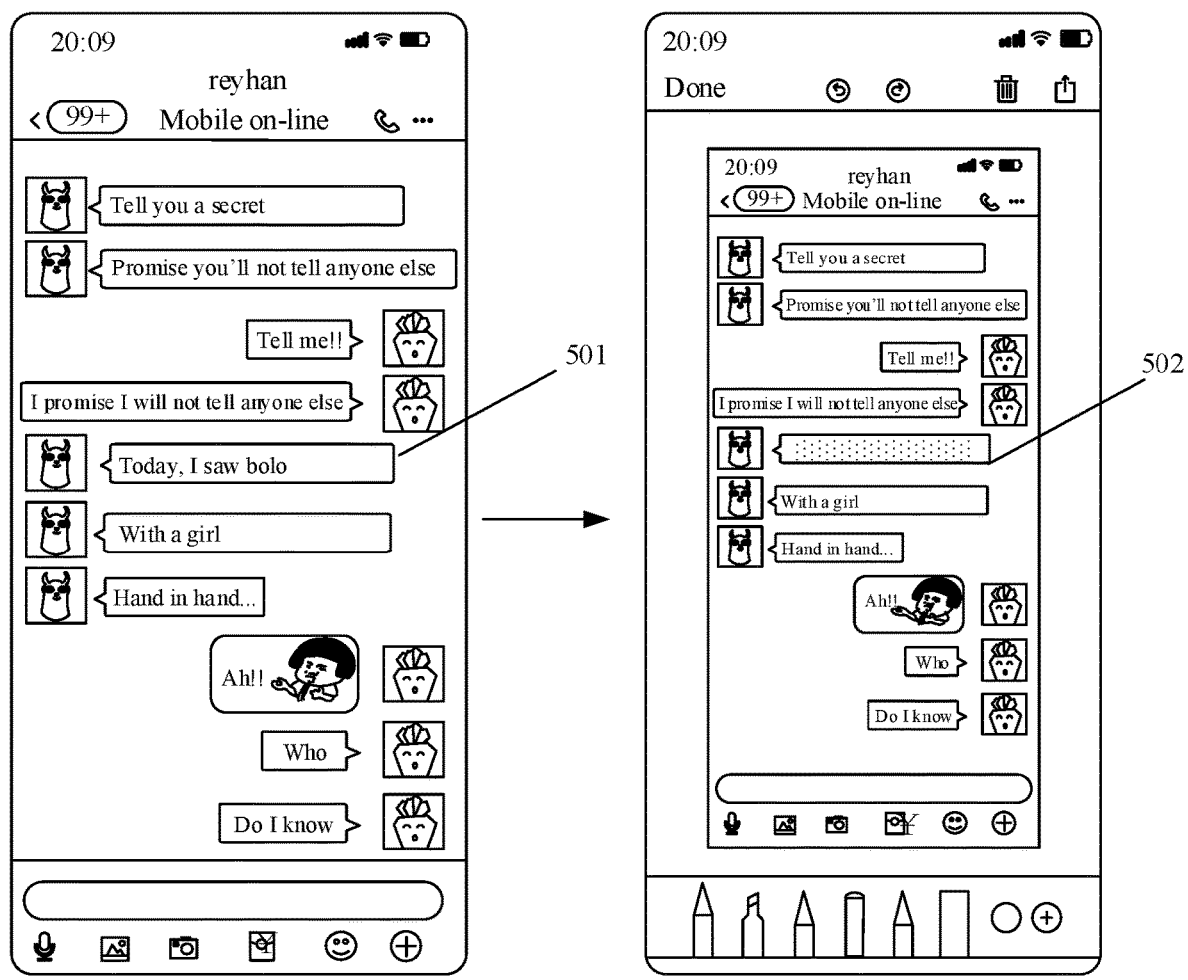
FIG. 5 is a schematic diagram of an example screen capturing process according to an embodiment of this disclosure.

As an example, FIG. 5 is a schematic diagram of a screen capturing process according to an embodiment of this disclosure. Referring to FIG. 5, the terminal displays a chat interface including multiple chat messages, the chat interface including a protected content 501. When a target operation instruction for instructing screen capturing (screen capturing operation) is received, a screenshot image including the protected content 501 is displayed, and protection processing is performed on the protected content 502 in the screenshot image, such as blocking the protected content.

In some embodiments, when the target operation is a screen capturing operation, the terminal may first hide the protected content on the chat interface, and then perform the screen capturing operation, such that the protected content in the screenshot image obtained by screen capturing processing is hidden.

Figure 6:
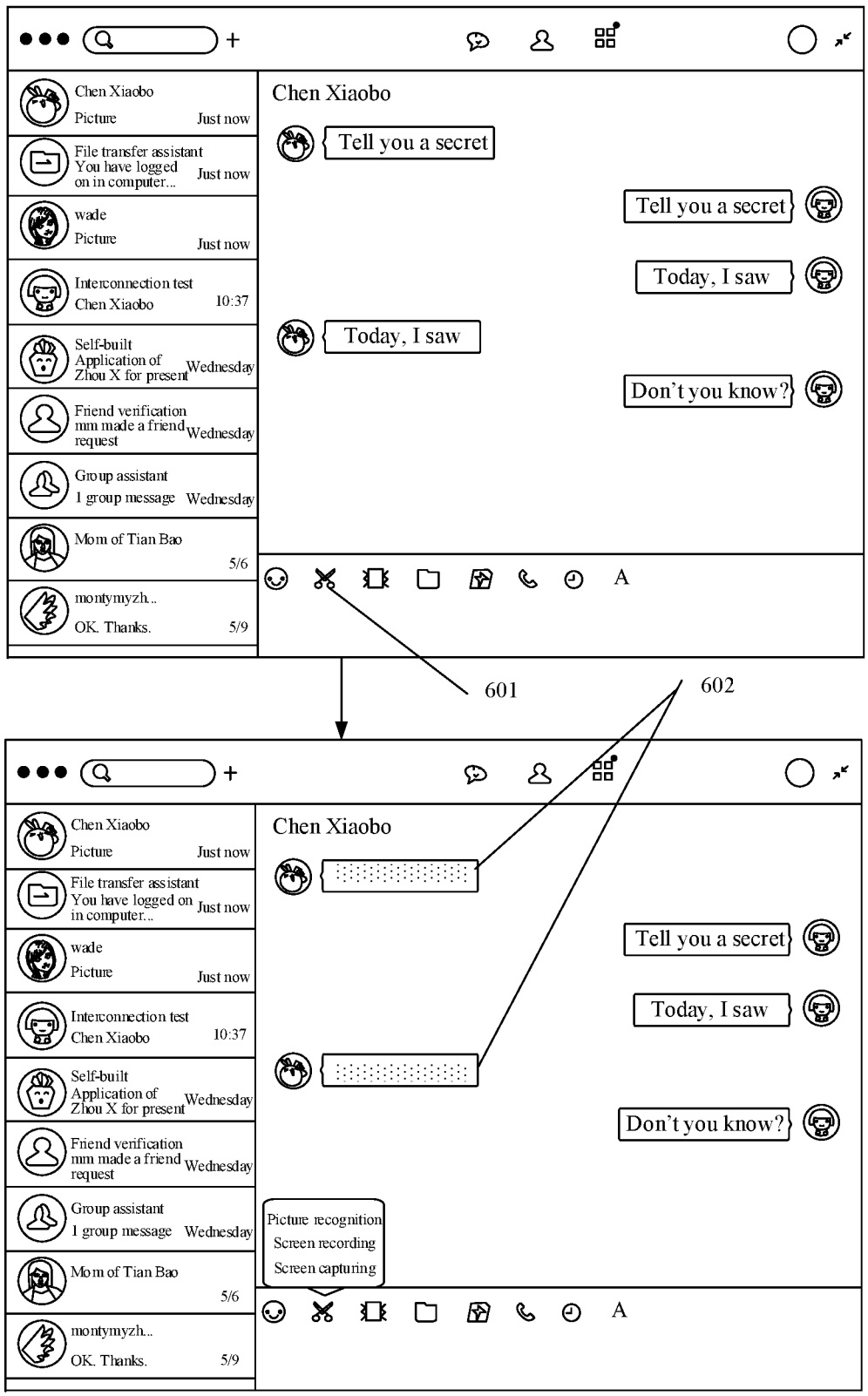
FIG. 6 is a schematic diagram of an example chat interface according to an embodiment of this disclosure.

For example, FIG. 6 is a schematic diagram of a chat interface according to an embodiment of this disclosure. Referring to FIG. 6, the terminal enters a screen capturing state when receiving a tap operation performed on a screen capturing button 601, and performs hiding processing on a protected content 602 on a chat interface in the screen capturing state. When receiving a region selection operation, the terminal determines a chat message in a screen capturing region corresponding to the region selection operation as a target chat message, the screen capturing region including the protected content 602 subjected to hiding processing. When a screen capturing confirmation operation is received, screen capturing processing is performed on the selected screen capturing region to obtain a screenshot image including the protected content 602 subjected to hiding processing. The protected content 602 in the screenshot image is hidden.

In some embodiments, the terminal may execute the target operation in the following manner: labeling the target chat message on the chat interface in response to the target operation instruction when the target operation is a selection operation performed on the target chat message. Accordingly, the terminal may hide, when the target chat message includes the protected content, the protected content in the execution result of the target chat message in the following manner: performing protection processing on the protected content in the labeled target chat message on the chat interface when the target chat message includes the protected content.

In practical implementation, when the target operation is a selection operation performed on the target chat message, the selected target chat message is labeled to indicate that the target chat message has been selected. One or more (two or more) target chat messages may be selected by the selection operation. The terminal detects the selected target chat message, and determines whether the target chat message includes the protected content according to a detection result. When the detection result indicates that the target chat message includes the protected content, protection processing is performed on the protected content in the target chat message, such as controlling the protected content to be non-browsable, or controlling the protected content to be non-forwardable. When the detection result indicates that the target chat message includes no protected content, no processing is performed.

Figure 7:
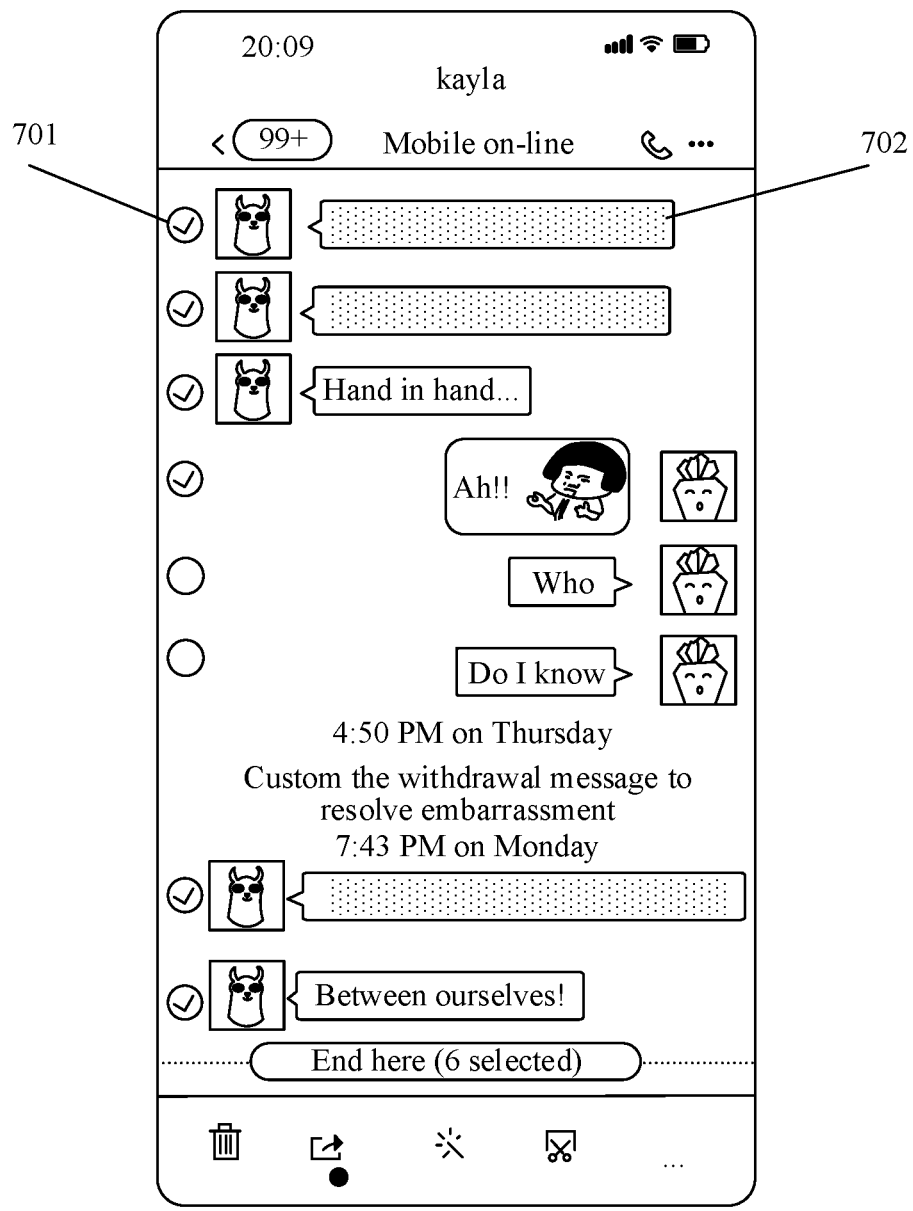
FIG. 7 is a schematic diagram of an example chat interface according to an embodiment of this disclosure.

As an example, FIG. 7 is a schematic diagram of a chat interface according to an embodiment of this disclosure. Referring to FIG. 7, a selected target chat message is labeled with a label 701, and a protected content in the target chat message is blocked. If a target chat message 702 is a protected content, blocking processing is performed on the target chat message 702, such that the target chat message 702 is non-browsable.

In some embodiments, after the target chat message is selected, a forwarding message for the target chat message may be triggered. When at least two target chat messages are selected, the at least two target chat messages may be merged into a merged chat message, and the merged chat message obtained by merging is forwarded; or, the at least two target chat messages may be forwarded one by one.

In some embodiments, after performing protection processing on the protected content in the labeled target chat message, the terminal merges, in response to a merging transmission instruction for the labeled target chat message when there are at least two target chat messages, the at least two target chat messages into a merged chat message, and transmits the merged chat message. The merged chat message is displayed on a chat interface corresponding to the merging transmission instruction, and protection processing is performed on a protected content in each target chat message in the merged chat message.

In practical implementation, when merging multiple (i.e., at least two) target chat messages into a merged chat message for forwarding, the terminal merges, in response to a merging transmission instruction, the multiple target chat messages according to transmission time of each target chat message so as to display each target chat message in the merged chat message according to the transmission time of each target chat message. After obtaining the merged chat message, the terminal transmits a transmission instruction for the merged chat message to the server, the transmission instruction containing the merged chat message and labeling information of the protected content. The server parses the transmission instruction to determine a receiver of the merged chat message, and hides the labeling information in the merged chat message for transmission to the receiver. A terminal of the receiver displays a corresponding chat interface, and displays on the chat interface the merged chat message whose protected content is subjected to protection processing. After transmitting the merged chat message to the target object, the terminal displays the merged chat message on a chat interface for a chat with the receiver, and performs protection processing on the protected content in the merged chat message.

Figure 8:
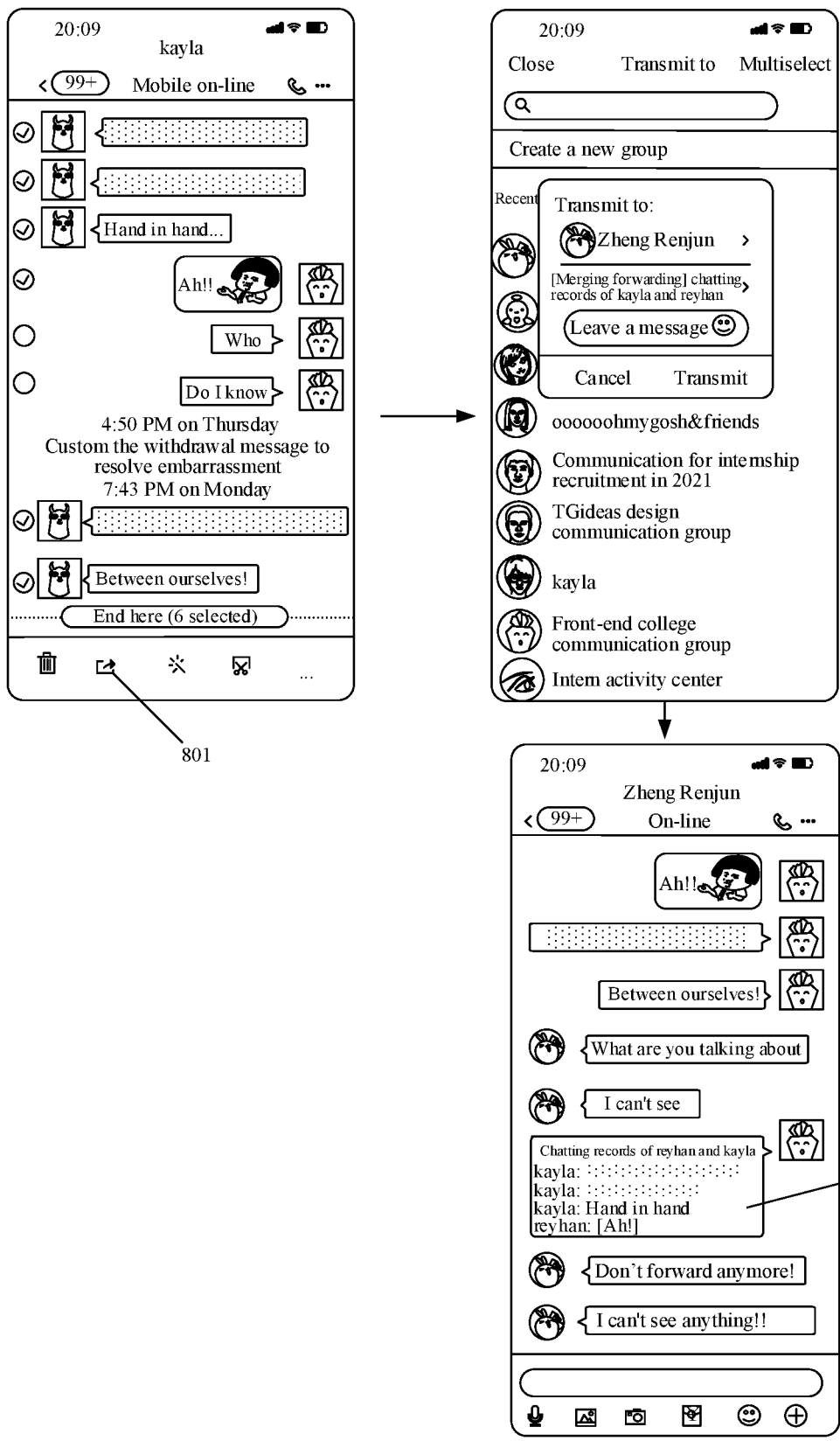
FIG. 8 is a schematic diagram of an example chat message sharing process according to an embodiment of this disclosure.

As an example, FIG. 8 is a schematic diagram of a chat message sharing process according to an embodiment of this disclosure. Referring to FIG. 8, a selection operation performed on multiple target chat messages is received on the chat interface, and the selected multiple target chat messages are labeled. When a tap operation performed on a sharing button 801 is received, a merging transmission instruction is triggered. The terminal displays multiple user objects in response to the merging transmission instruction. The user may select one from the multiple user objects as a receiver of the target chat messages. The multiple target chat messages are merged into one chat message (merged chat message) for transmission to a terminal of the selected receiver. The merged chat message 802 is displayed on a chat interface for a chat with the receiver. A protected content in each target chat message in the merged chat message is blocked. That is, the protected content in each target chat message in the merged chat message is non-browsable.

Figure 9:
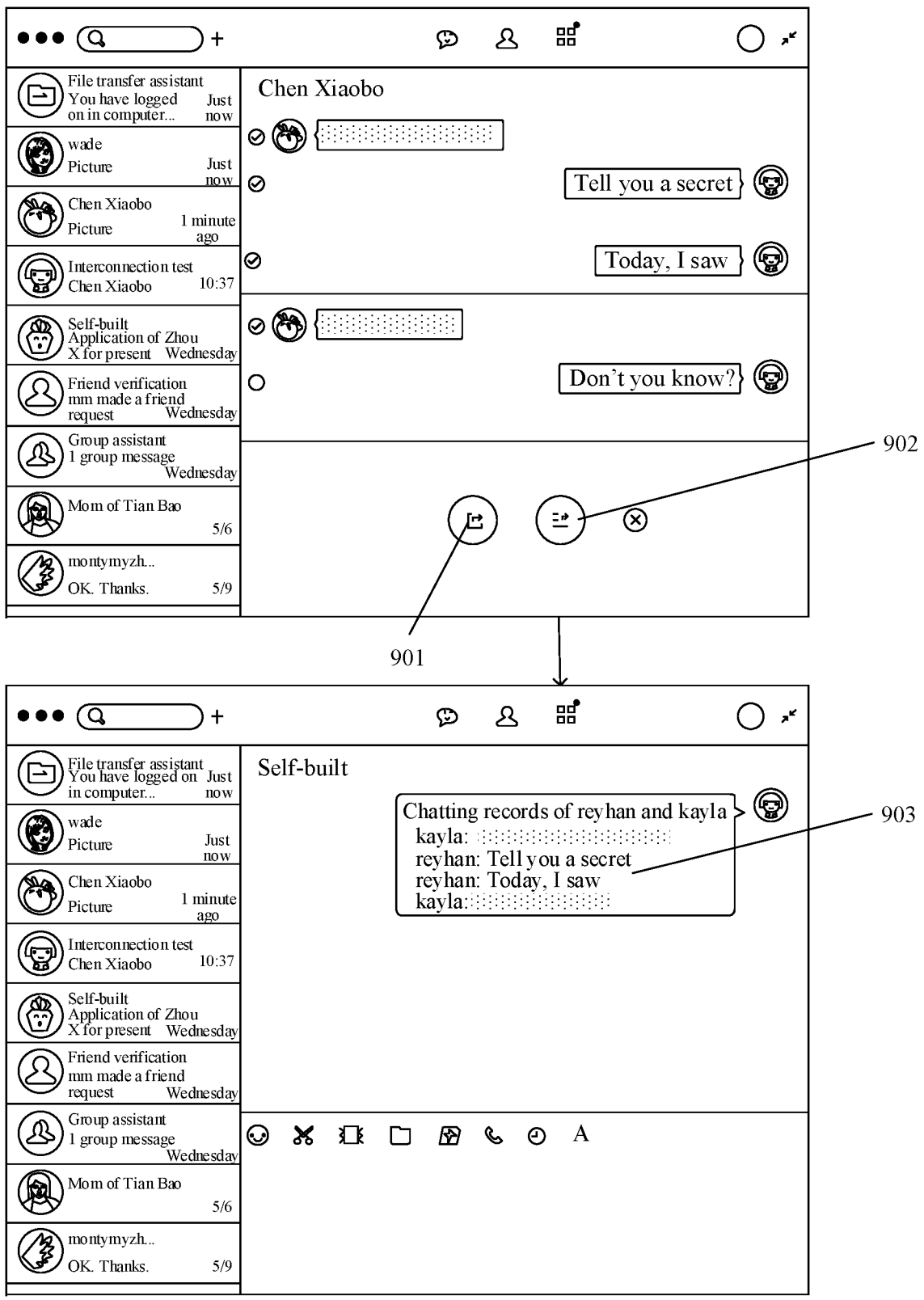
FIG. 9 is a schematic diagram of an example chat message sharing process according to an embodiment of this disclosure.

As an example, FIG. 9 is a schematic diagram of a chat message sharing process according to an embodiment of this disclosure. A selection operation performed on multiple target chat messages is received on the chat interface, the selected multiple target chat messages are labeled, and a one-by-one forwarding button 901 and a merging forwarding button 902 are displayed. When a tap operation performed on the merging forwarding button 902 is received, multiple user objects are displayed. The user may select one from the multiple user objects as a receiver of the target chat messages. A merged chat message including the multiple target chat messages is transmitted to a terminal of the selected receiver. The merged chat message 903 whose protected content is subjected to protection processing is displayed on a chat interface for a chat with the receiver.

In some embodiments, after performing protection processing on the protected content in the labeled target chat message, the terminal transmits, in response to a one-by-one transmission instruction for each target chat message when there are at least two target chat messages, each target chat message one by one. Each target chat message is displayed one by one on a chat interface corresponding to the one-by-one transmission instruction, and protection processing is performed on a corresponding protected content in each target chat message.

In practical implementation, when each target chat message is transmitted one by one, and the target chat message is displayed on the chat interface corresponding to the one-by-one transmission instruction, each target chat message corresponds to a message box. For each target chat message, when the target chat message includes a protected content, protection processing is performed on the protected content in the target chat message.

Figure 10:
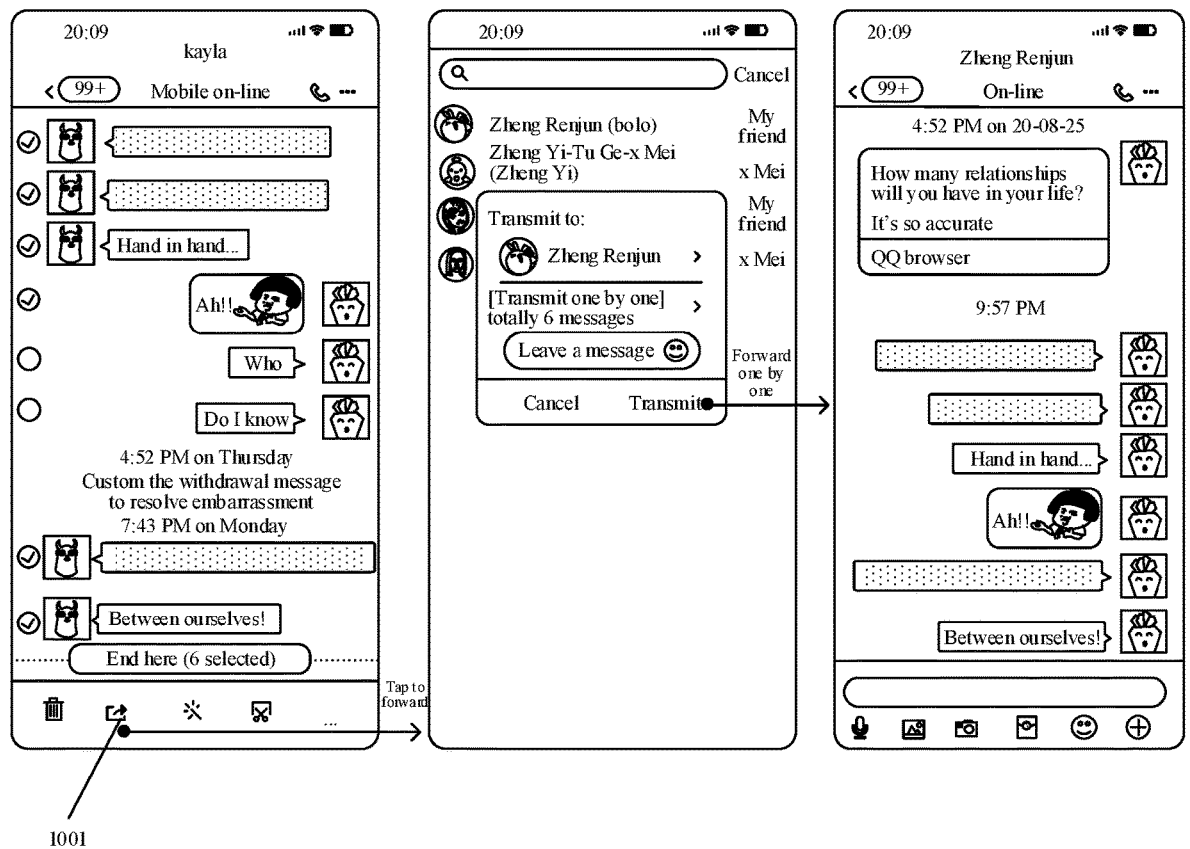
FIG. 10 is a schematic diagram of an example chat message sharing process according to an embodiment of this disclosure.

FIG. 10 is a schematic diagram of a chat message sharing process according to an embodiment of this disclosure. Referring to FIG. 10, a selection operation performed on multiple target chat messages is received on the chat interface, and the selected multiple target chat messages are labeled. When a tap operation performed on a sharing button 1001 is received, multiple user objects are displayed. The user may select one from the multiple user objects as a receiver of the target chat messages. Each target chat message is transmitted to a terminal of the selected receiver one by one. Each chat message whose protected content is subjected to protection processing is displayed on a chat interface for a chat with the receiver. For example, the protected content in the target chat message is blocked to be non-browsable.

Figure 11:
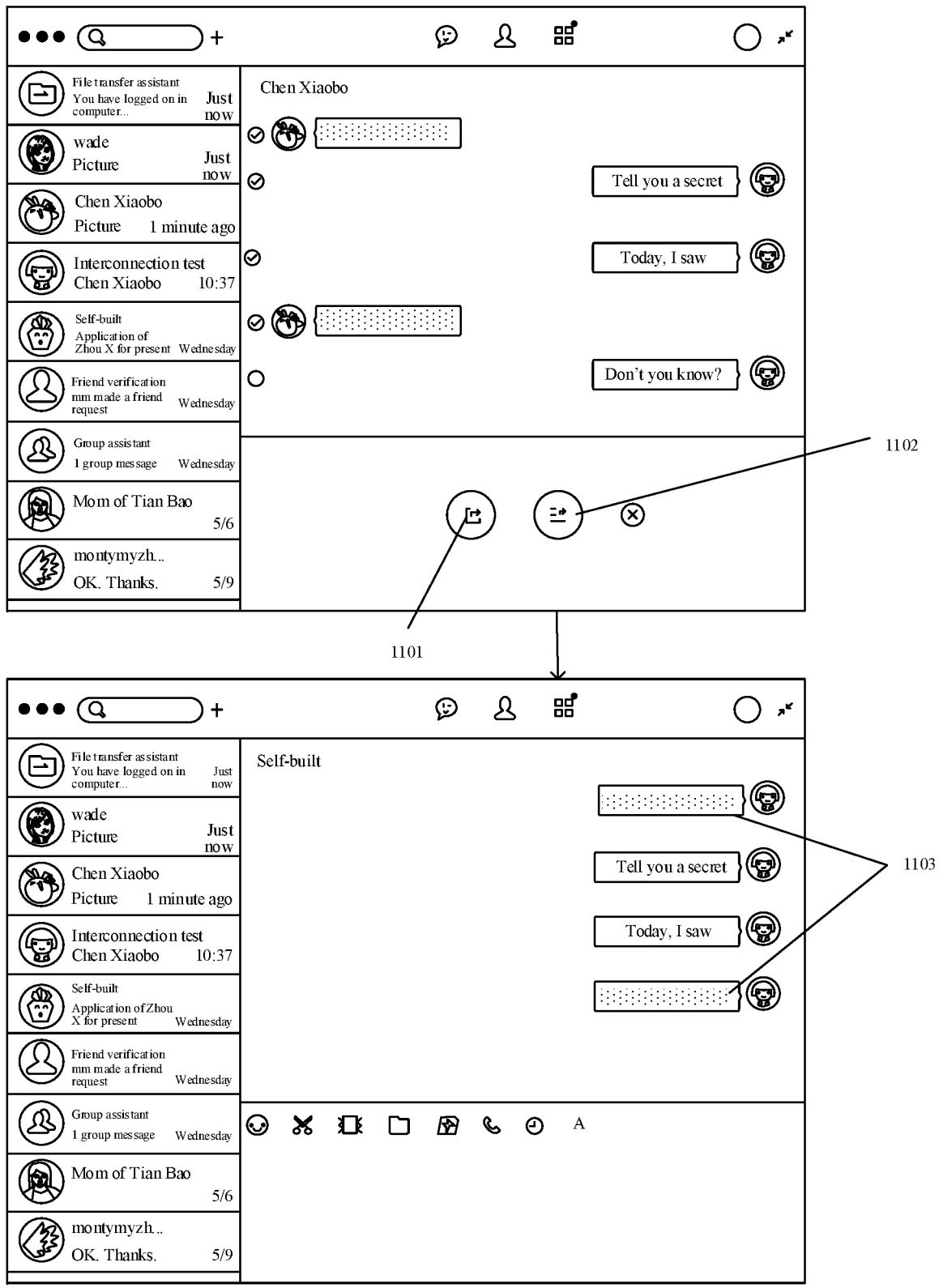
FIG. 11 is a schematic diagram of an example chat message sharing process according to an embodiment of this disclosure.

FIG. 11 is a schematic diagram of a chat message sharing process according to an embodiment of this disclosure. Referring to FIG. 11, a selection operation performed on multiple target chat messages is received on the chat interface, the selected multiple target chat messages are labeled, and a one-by-one forwarding button 1101 and a merging forwarding button 1102 are displayed. When a tap operation performed on the sharing button 1101 is received, the terminal displays multiple user objects. The user may select one from the multiple user objects as a receiver of the target chat messages. Each target chat message is transmitted to a terminal of the selected receiver one by one. Each target chat message 1103 whose protected content is subjected to protection processing is displayed on a chat interface for a chat with the receiver. For example, the protected content in the target chat message 1103 is blocked to be non-browsable.

In some embodiments, after performing protection processing on the protected content in the execution result of the target chat message, the terminal may further display prompt information in response to a forwarding operation performed on the execution result, the prompt information being used for indicating that the protected content is non-forwardable.

In practical implementation, when protection processing is controlling the protected content to be non-forwardable, even if a forwarding operation performed on the execution result is received, the forwarding operation is not executed, and instead, prompt information is displayed to inform a user that the protected content is non-forwardable. For example, prompt information "xxxx is non-forwardable" is displayed.

In some embodiments, the terminal may further display, in a correlated region of a chat message including a protected content on the chat interface, a protection identifier corresponding to the chat message, the protection identifier being used for indicating that the chat message includes the protected content. Accordingly, the terminal may hide, when the target chat message includes the protected content, the protected content in the execution result of the target chat message in the following manner: performing protection processing on the target chat message in the execution result of the target chat message when a protection identifier corresponding to the target chat message is displayed in the correlated region of the target chat message.

In practical implementation, a protection identifier may be used to indicate that a chat message includes a protected content so as to prompt the user not to share the chat message to other user objects. In addition, the terminal may recognize the chat message including the protected content according to the protection identifier. That is, if a protection identifier corresponding to the target chat message is displayed in the correlated region of the target chat message, it indicates that the target chat message includes the protected content, and protection processing on the target chat message in the execution result may be performed.

Figure 12:
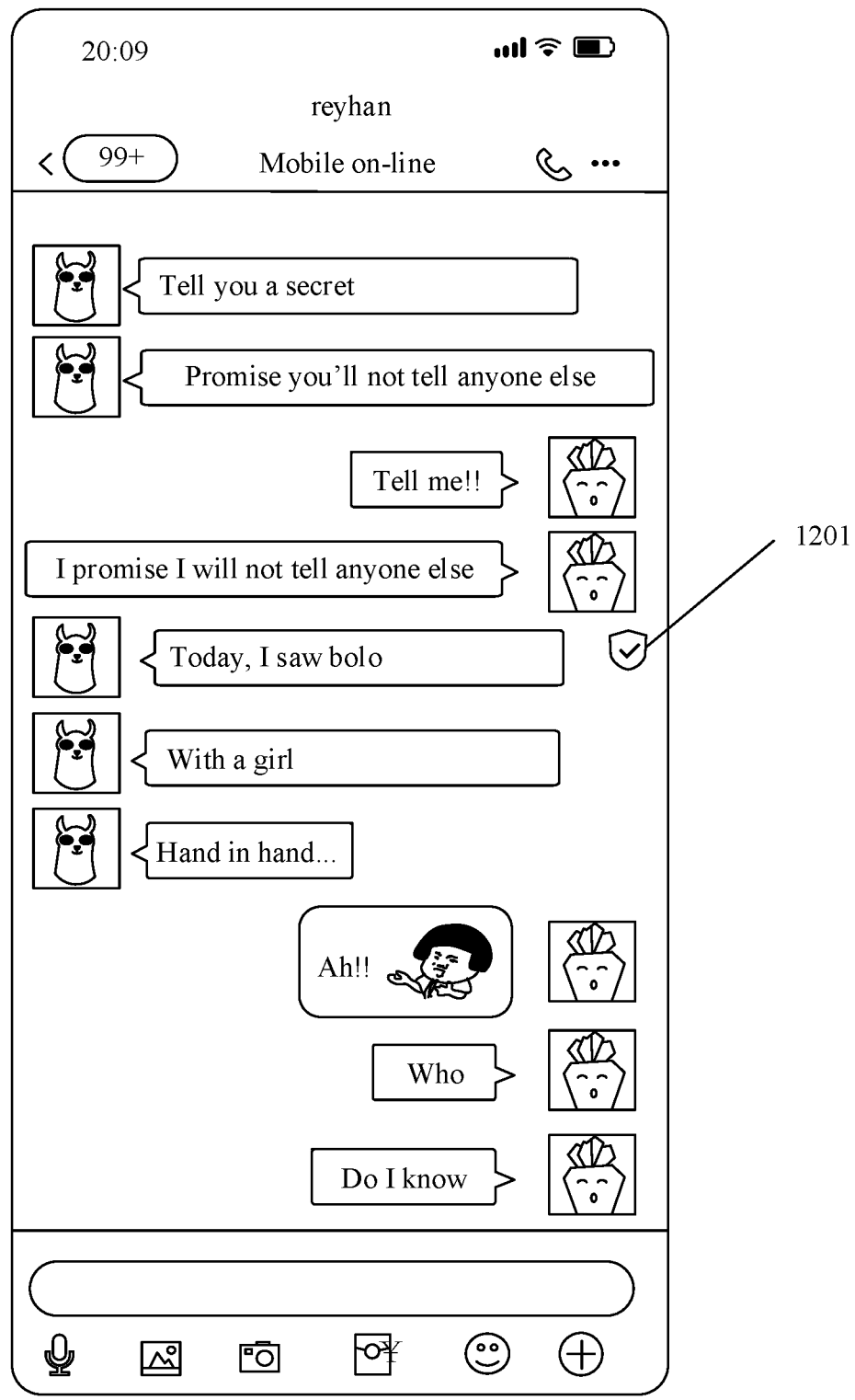
FIG. 12 is a schematic diagram of an example chat interface according to an embodiment of this disclosure.

As an example, FIG. 12 is a schematic diagram of a chat interface according to an embodiment of this disclosure. Referring to FIG. 12, a protection identifier is displayed next to a chat message 1201 to indicate that the chat message includes a protected content. If a target operation instruction, such as a forwarding operation instruction, for the chat message 1201 is received, the chat message 1201 is forwarded after protection processing.

In some embodiments, the terminal may hide, when the target chat message includes the protected content, the protected content in the execution result of the target chat message in the following manner: adding, when the target chat message includes the protected content, a static or dynamic target image to a position of the protected content in the execution result of the target chat message, such that the protected content is overlaid with the target image.

In practical implementation, the protected content may be blocked by overlaying with a target image at a position of the protected content. The target image may be static, such as a mosaic and an interesting map, or dynamic, such as a special effect image in incineration. It is to be noted that when the target chat message includes the protected content, a static or dynamic target image may also be added to a position of the target chat message in the execution result of the target chat message, such that the target chat message is overlaid with the target image. Therefore, the whole target chat message is blocked to implement protection processing over the protected content in the target chat message.

Figure 13:
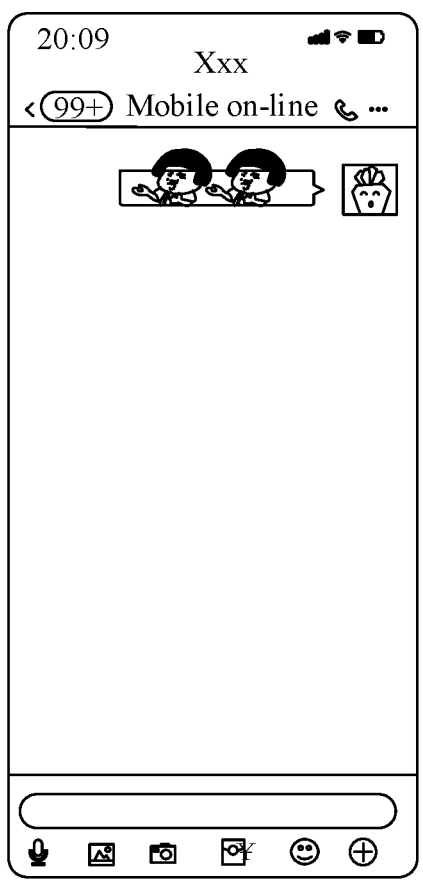
FIG. 13 is a schematic diagram of an example chat interface according to an embodiment of this disclosure.

For example, FIG. 13 is a schematic diagram of a chat interface according to an embodiment of this disclosure. Referring to FIG. 13, for a target chat message to be forwarded including a protected content, a cartoon map is displayed at a position of the protected content in the target chat message to block the protected content in the target chat message.

In some embodiments, the terminal may hide, when the target chat message includes the protected content, the protected content in the execution result of the target chat message in the following manner: performing, when the target chat message includes the protected content, blurring processing on the protected content in the execution result of the target chat message, such that the protected content is blocked.

That the protected content is blocked means that the protected content is non-browsable, namely the protected content is hidden, and the user may not browse the protected content.

In practical implementation, the terminal may block the protected content by blurring processing. For example, the protected content may be blocked by Gaussian blurring processing. Gaussian blurring processing is also referred to as Gaussian smoothing processing with a visual effect of observing the image through ground glass. The Gaussian fuzzy processing may be implemented by convolving the image with a normal distribution. A blurring processing range is within an information carrier box. For example, a Gaussian blurring value is set to 18.

In some embodiments, the terminal may perform, when the target chat message includes the protected content, protection processing on the protected content in the execution result of the target chat message in the following manner: deleting the protected content from the execution result of the target chat message when the target chat message includes the protected content.

In practical implementation, the terminal may directly delete the protected content from the target chat message to perform protection processing on the protected content. In addition, when the target operation is a selection operation performed on selecting multiple target chat messages, if some of the multiple target chat messages corresponding to the selection operation include protected contents, while some do not include any protected content, the target chat messages including the protected contents may be deleted from a selection result, namely selection of the target chat messages including the protected contents is canceled. If a transmission operation performed on the selected target chat messages is subsequently executed, the target chat messages including the protected contents are not transmitted. For example, in selected target chat message 1, target chat message 2, and target chat message 3, target chat message 1 includes a protected content, while neither target chat message 2 nor target chat message 3 includes a protected content. In this case, target chat message 1 is directly deleted from a selection result, and when a transmission operation performed on the selected target chat messages is subsequently executed, target chat message 2 and target chat message 3, but not target chat message 1 including the protected content, are transmitted.

In some embodiments, before receiving the target operation instruction for instructing the target operation to be executed on the target chat message, the terminal may further display, when the target chat message is a voice message, a text content corresponding to the voice message in response to a text viewing instruction for the voice message. The terminal may execute the target operation on the target chat message in response to the target operation instruction in the following manner: performing, in response to the target operation instruction when the target operation is a screen capturing operation, screen capturing processing on a region including the text content to obtain a screenshot image including the text content. The terminal may hide, when the target chat message includes the protected content, the protected content in the execution result of the target chat message in the following manner: performing protection processing on the text content in the screenshot image when the voice message includes the protected content.

In practical implementation, the terminal provides a function of converting a voice message into corresponding text content, and the user may trigger a text viewing instruction for the voice message to view the text content corresponding to the voice message. After the text content is displayed, the user may obtain a screenshot image including the text content through a screen capturing operation to share the text content to another user object by sharing the screenshot image. In order to prevent the voice message from being leaked in form of the text content, in this example, protection processing is performed on the text content after the screenshot image including the text content is obtained, and then the screenshot image whose text content is subjected to protection processing is shared to the other user object.

In some embodiments, the terminal may further receive a chat message including a protected content, display the received chat message, the protected content in the chat message being subjected to protection processing, transmit a viewing request to an original transmitting end (the original transmitting end may also be referred to as an original transmitter) of the chat message in response to a viewing operation performed on the protected content, obtain the protected content transmitted by the original transmitting end and not subjected to protection processing when the original transmitting end triggers an agree-to-view instruction, and display the protected content not subjected to protection processing.

An original transmitting end of a chat message refers to a transmitting end that first transmits the chat message rather than a forwarding end of the chat message. In practical implementation, if the user may not obtain the protected content after protection processing is performed on the protected content in the displayed chat message, the user may trigger a viewing operation performed on the protected content to obtain the protected content in the chat message. For example, the terminal may display a viewing icon in a correlated region of the protected content so as to receive the viewing operation through the viewing icon. After receiving the viewing operation, the terminal transmits a viewing request containing a user identifier of the current user to the server. The server transmits the viewing request to the original transmitting end of the protected content. The original transmitting end displays the received viewing request, and determines whether to trigger an agree-to-view instruction based on the viewing request. When triggering the agree-to-view instruction, the original transmitting end may retransmit the protected content not subjected to protection processing to the server. The server transmits the protected content not subjected to protection processing to the current terminal. The current terminal displays the protected content not subjected to protection processing on the chat interface. When the original transmitting end triggers a reject-to-view instruction, the server may transmit prompt information to the current terminal to prompt the user that the protected content is non-viewable.

Figure 14:
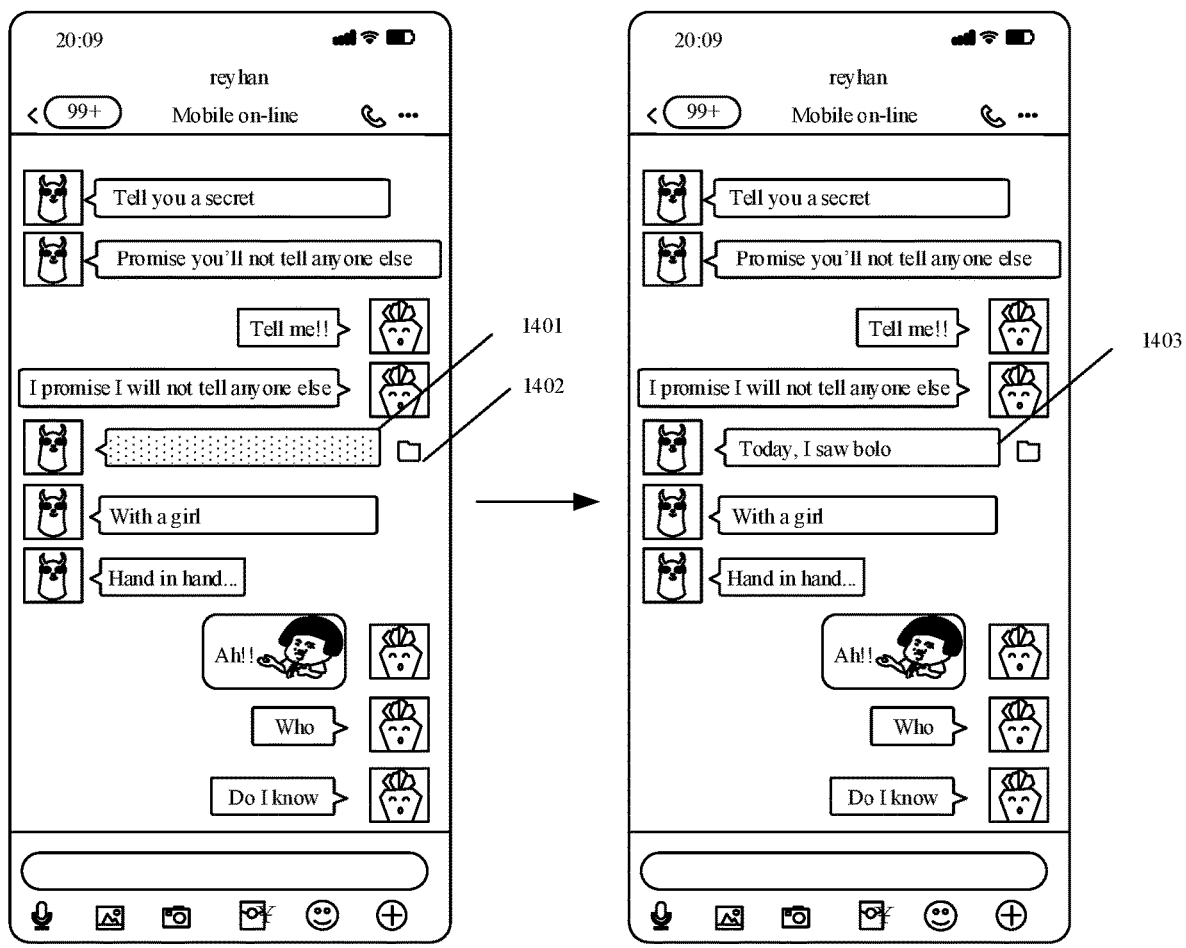
FIG. 14 is a schematic diagram of an example chat interface according to an embodiment of this disclosure.

As an example, FIG. 14 is a schematic diagram of a chat interface according to an embodiment of this disclosure. Referring to FIG. 14, a chat message 1401 including a protected content subjected to protection processing is displayed on the chat interface, and a viewing button 1402 is displayed next to the chat message 1401. When a tap operation regarding the viewing button 1402 is received, the terminal transmits a viewing request to an original transmitting end of the chat message. When the original transmitting end triggers an agree-to-view instruction, the protected content 1403 is displayed in a correlated region of the chat message.

In some embodiments, the terminal may display a privacy protection control on the chat interface, display a message input control corresponding to a privacy protection mode in response to a triggering operation performed on the privacy protection control, receive the protected content input based on the message input control corresponding to the privacy protection mode, transmit the protected content in response to a transmission instruction for the protected content, and display the protected content on the chat interface, the protected content being hidden in an execution result of the protected content when a target operation instruction for instructing a target operation to be executed on the protected content is triggered at a receiving end.

In practical implementation, the user may first trigger a privacy protection control. The terminal controls a message input mode to be a privacy protection mode in response to the triggering operation. All contents input through messages in this privacy protection mode are protected contents. The input content may be an image, a text, a voice, etc. In order to prevent the protected content from being leaked, after the protected content is shared to another user object (receiver), if the receiver of the protected content triggers a target operation instruction for instructing a target operation to be executed on the protected content through a corresponding receiving end, protection processing is performed on the protected content in an execution result of the protected content.

Figure 15:
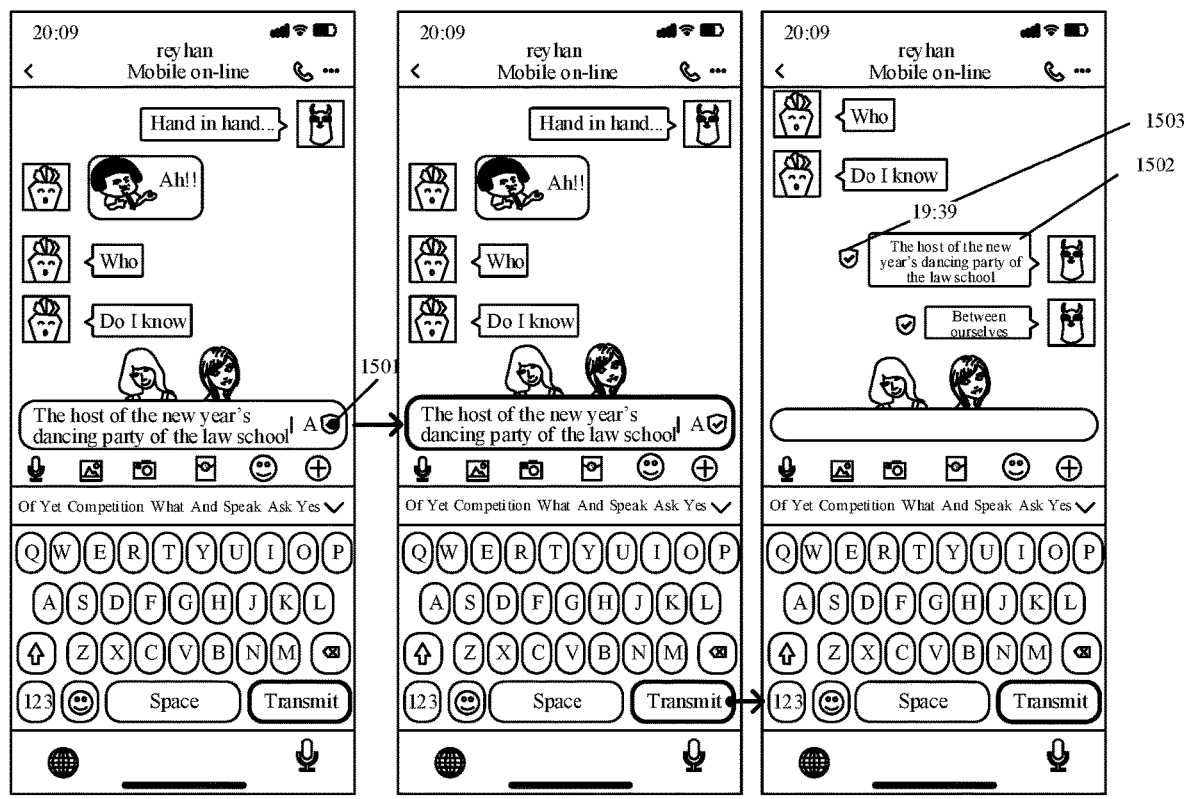
FIG. 15 is a schematic diagram of an example chat interface according to an embodiment of this disclosure.

As an example, FIG. 15 is a schematic diagram of a chat interface according to an embodiment of this disclosure. Referring to FIG. 15, a privacy protection control 1501 is displayed on the chat interface. When a tap operation performed on the privacy protection control 1501 is received, a message input mode is controlled to be a privacy protection mode. In this privacy protection mode, an input chat message is a protected content. When a transmission instruction for the input protected content is received, the protected content is transmitted to a terminal of a receiver, the protected content 1502 is displayed on a chat interface of the receiver, and moreover, a protection identifier 1503 is displayed next to the chat message (i.e., the protected content 1502), the identifier being used for indicating that the corresponding chat message is a protected content. The chat message (i.e., the protected content 1502) may also be displayed on a chat interface with the current object at a terminal side of the receiver. However, when the terminal of the receiver receives a target operation instruction (such as a forwarding instruction) for executing a target operation (such as a forwarding operation) on the protected content 1502, protection processing is performed on the protected content when the protected content is forwarded. That is, when the protected content is forwarded to a target object, the chat message displayed by a terminal of the target object side on a corresponding chat interface is a chat message whose protected content is subjected to protection processing.

In some embodiments, the terminal may receive a protection setting instruction for at least one chat message on the chat interface, and set the at least one chat message as a protected content in response to the protection setting instruction, so as to perform protection processing on the protected content in an execution result of the protected content when a target operation instruction for instructing a target operation to be executed on the protected content is triggered at a receiving end.

In practical implementation, the terminal may also set the chat message as a protected content after transmitting the chat message.

Figure 16:
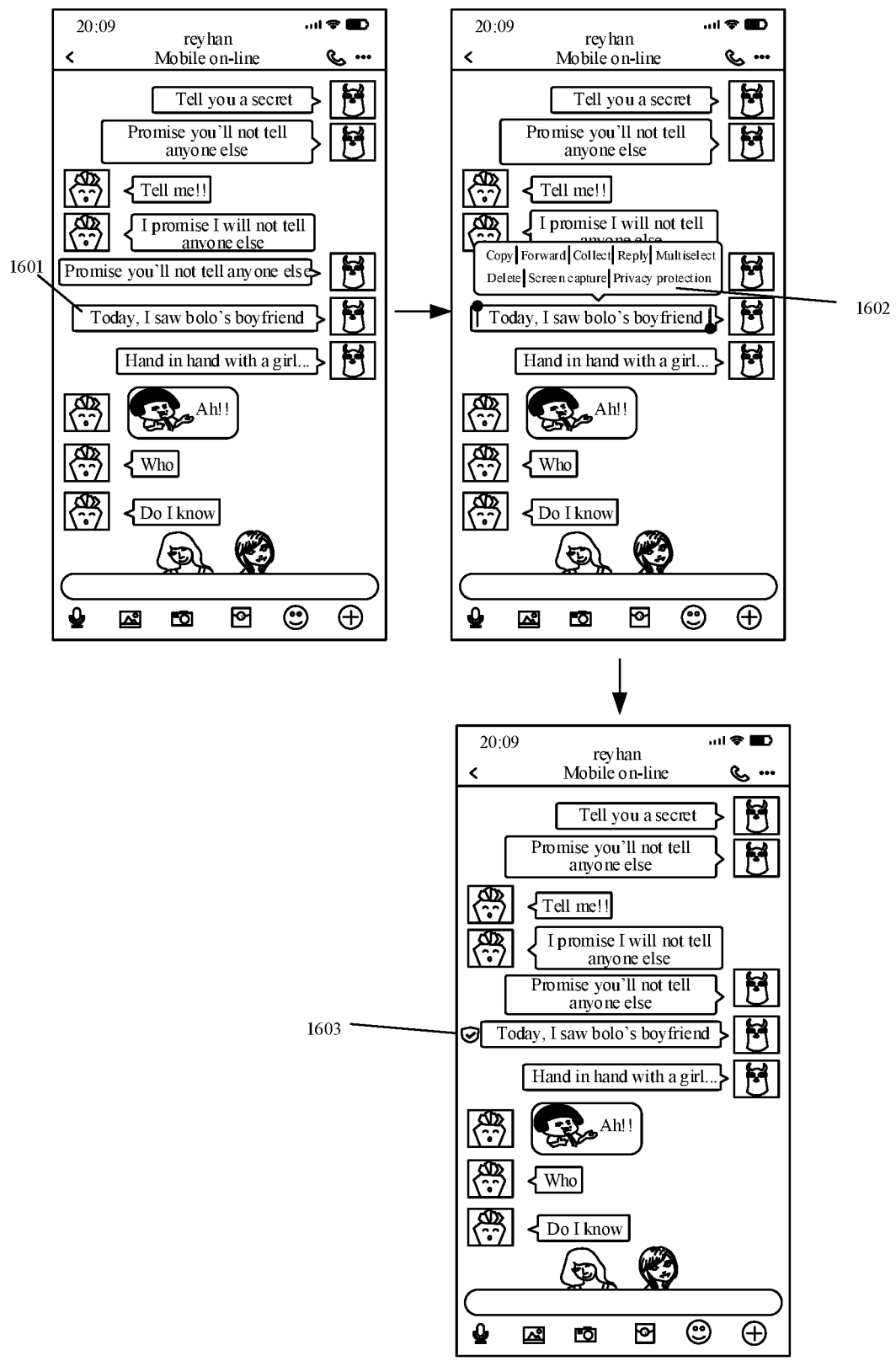
FIG. 16 is a schematic diagram of an example chat interface according to an embodiment of this disclosure.

As an example, FIG. 16 is a schematic diagram of a chat interface according to an embodiment of this disclosure. Referring to FIG. 16, multiple chat messages are displayed on the chat interface, including a received chat message and a transmitted chat message. For the transmitted chat message, such as a chat message 1601, when a long-press operation performed on the chat message 1601 is received, a toolbar corresponding to the chat message 1601 is displayed, including a privacy protection button 1602. When receiving a tap operation performed on the privacy protection button, the terminal sets the chat message 1601 as a protected content, and displays a protection identifier 1603 next to the chat message to indicate that the chat message is a protected content.

Figure 17:
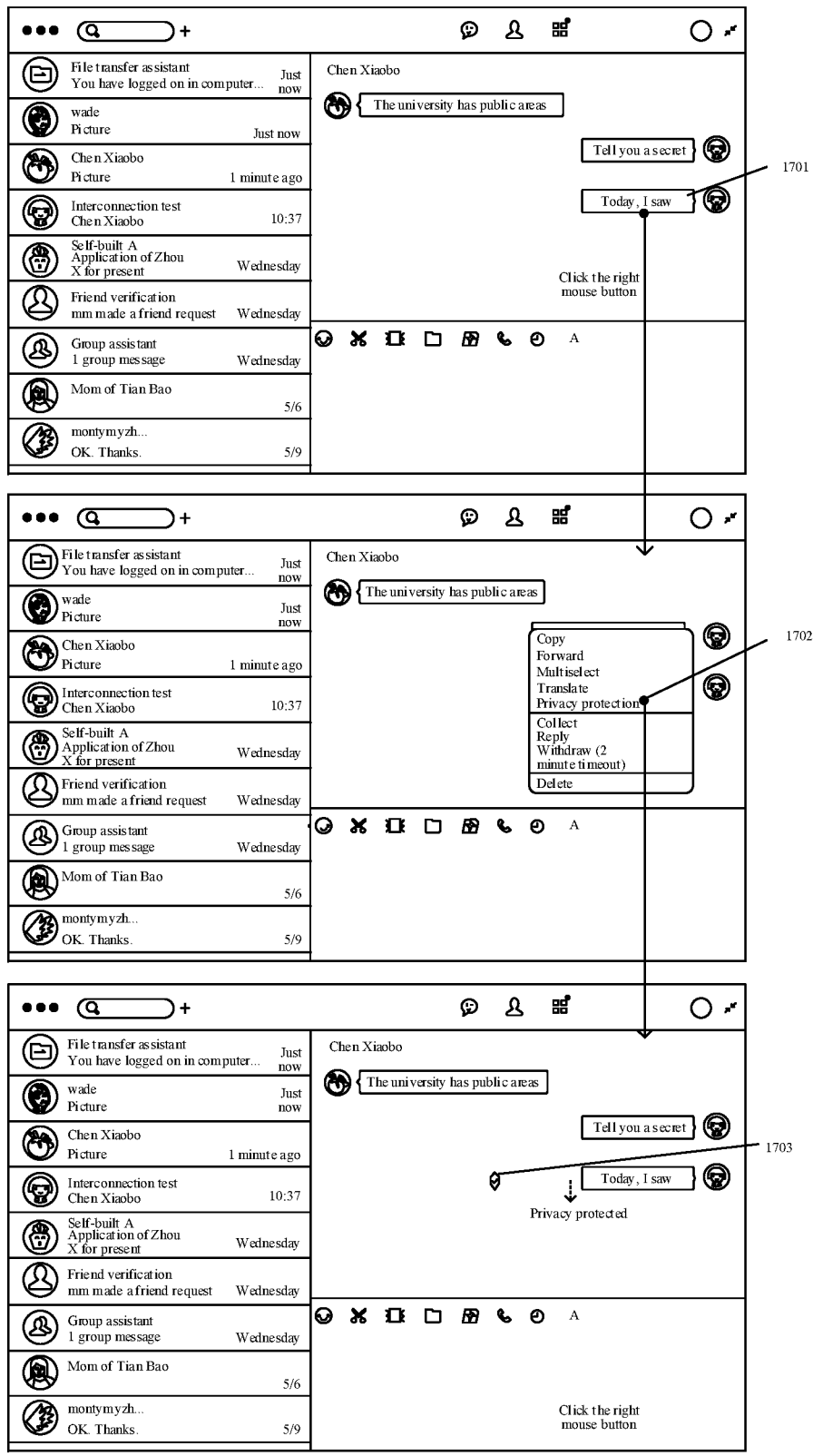
FIG. 17 is a schematic diagram of an example chat interface according to an embodiment of this disclosure.

As an example, FIG. 17 is a schematic diagram of a chat interface according to an embodiment of this disclosure. Referring to FIG. 17, multiple chat messages are displayed on the chat interface, including a received chat message and a transmitted chat message. For the transmitted chat message, such as a chat message 1701, when the user triggers a tap operation performed on the chat message 1701 through a right mouse button, a toolbar corresponding to the chat message 1701 is displayed, including a privacy protection button 1702. When the user receives a tap operation performed on the privacy protection button through a left mouse button, the chat message 1701 is set as a protected content, and a protection identifier 1703 is displayed next to the chat message to indicate that the chat message is a protected content.

In some embodiments, the terminal may further receive a protection setting instruction for a partial content in a chat message on the chat interface, and determine the partial content indicated by the protection setting instruction in the chat message as a protected content in response to the protection setting instruction, so as to perform protection processing on the protected content in an execution result of the chat message when a target operation instruction for instructing a target operation to be executed on the chat message is triggered at a receiving end.

In practical implementation, the terminal may determine a whole chat message as a protected content, or determine a partial content in a chat message as a protected content. The user may select a partial content to be protected from a chat message, and then trigger a protection setting instruction for the partial content to determine the partial content as a protected content. The selection operation performed on the partial content may be triggered by a swipe operation. For example, a starting position of the swipe operation and an ending position of the swipe operation are obtained, and a partial content in the chat message between the starting position and the ending position is set as a protected content. Alternatively, the selection operation may be triggered by a tap operation. For example, a first tap position corresponding to a first tap operation and a second tap position corresponding to a second tap operation are obtained, and a partial content between the first tap position and the second tap position is set as a protected content.

Figure 18:
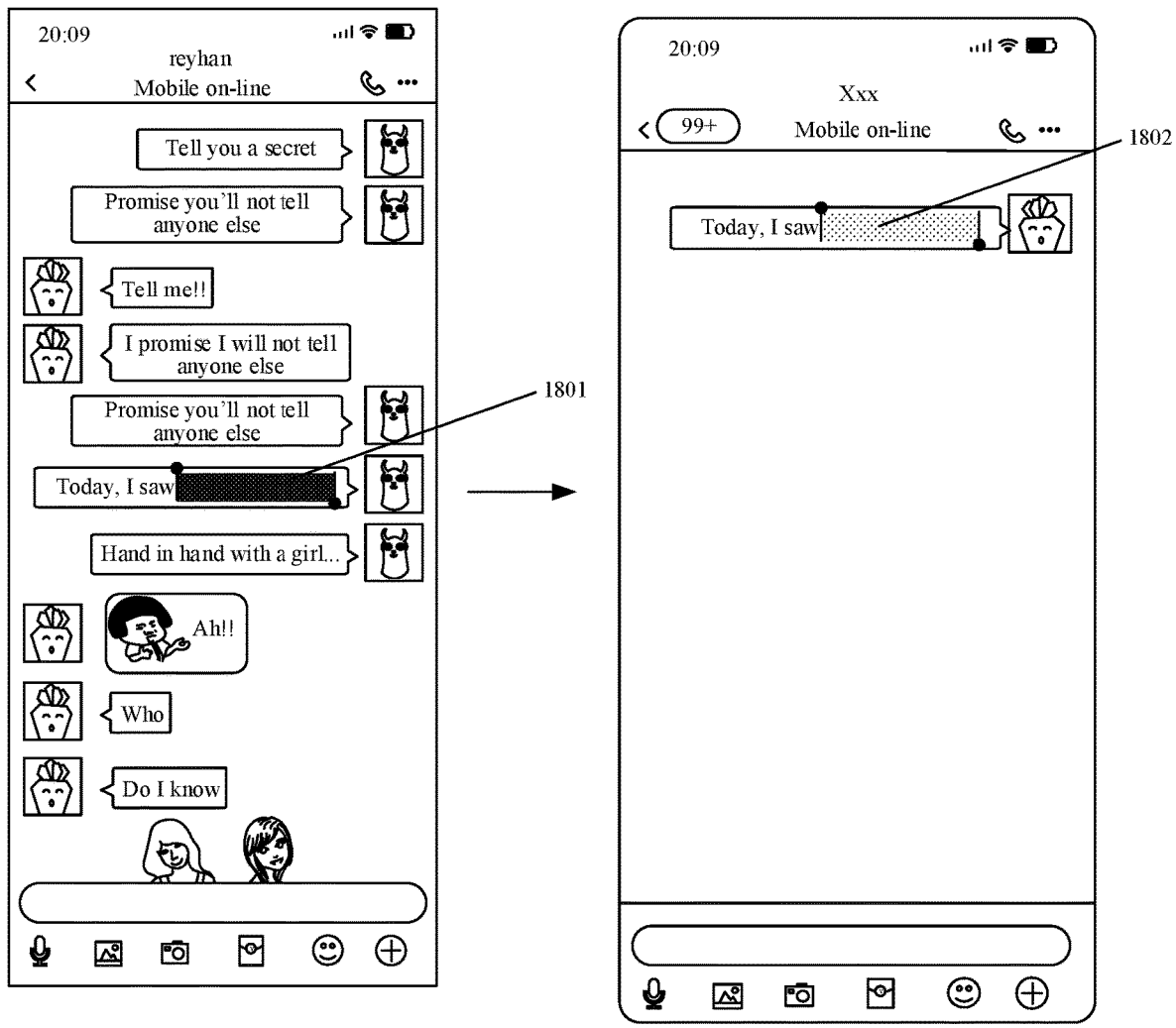
FIG. 18 is a schematic diagram of an example chat interface according to an embodiment of this disclosure.

As an example, FIG. 18 is a schematic diagram of a chat interface according to an embodiment of this disclosure. Referring to FIG. 18, a content in a shaded part 1801 in a chat message is a protected content. When a forwarding instruction for the chat message including the protected content is received, the chat message 1802 whose protected content is subjected to protection processing is displayed on a chat interface for a chat with a receiver of the chat message.

In some embodiments, the terminal may further transmit sharing prompt information to a transmitting end of the target chat message after hiding the protected content in the execution result of the target chat message, the sharing prompt information being used for prompting that the target chat message is shared after protection processing is performed on the protected content in the target chat message.

In practical implementation, after the protected content is hidden in the execution result of the target chat message, sharing prompt information may be automatically transmitted to the transmitting end of the target chat message so as to inform the user of the transmitting end that the target chat message has been shared and protection processing has been performed on the protected content in the target chat message.

The transmitting end may be an original transmitting end of the target chat message or a forwarding end that forwards the target chat message.

In some examples, a target operation is executed on a target chat message in response to a target operation instruction, and the protected content is hidden in an execution result of the target chat message when the target chat message includes a protected content. In this way, the protected content in the target chat message is hidden in response to detecting that the target chat message including the protected content is to be shared, so that the protected content may be prevented from being spread and leaked, and the security of the protected content may be improved.

Figure 19:
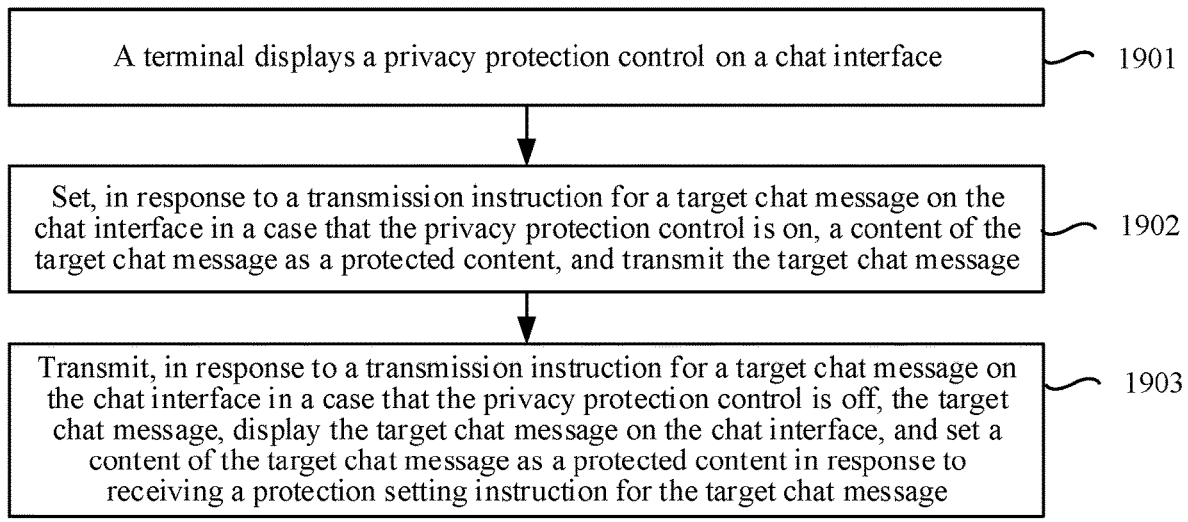
FIG. 19 is a schematic flowchart of an example message processing method according to an embodiment of this disclosure.

FIG. 19 is a schematic flowchart of a message processing method according to an embodiment of this disclosure. Referring to FIG. 19, the message processing method includes:

Step 1901: A terminal displays a privacy protection control on a chat interface.

In practical implementation, a client is set in the terminal, such as an instant messaging client, a social client, a learning client, or a game client, a chat interface is displayed through the client, and a user may communicate with another user through the chat interface. A privacy protection control is displayed on a chat interface. The privacy protection control is used for controlling a privacy protection mode to be turned on and off. A privacy protection mode is entered when the privacy protection control is on. The privacy protection mode is exited when the privacy protection control is off.

Step 1902: Set, in response to a transmission instruction for a target chat message on the chat interface when the privacy protection control is on, a content of the target chat message as a protected content, and transmit the target chat message.

Protection processing is performed on the protected content in an execution result of the protected content when a target operation instruction for instructing a target operation to be executed on the protected content is triggered at a receiving end.

In practical implementation, a message input mode is a privacy protection mode when the privacy protection control is on. All chat messages input through a message input control in this mode are protected contents. When the user enters a target chat message through the message input control, and triggers a transmission instruction for the target chat message, the terminal sets the target chat message as a protected content in response to the transmission instruction, and transmits the target chat message. After the target chat message is transmitted, in order to prevent the protected content from being leaked, after the target chat message is shared to another user object, if the receiver of the target chat message triggers a target operation instruction for instructing a target operation to be executed on the target chat message through a corresponding receiving end, protection processing is performed on the target chat message (i.e., the protected content) in an execution result of the target chat message.

Step 1903: Transmit, in response to a transmission instruction for a target chat message on the chat interface when the privacy protection control is off, the target chat message, display the target chat message on the chat interface, and set a content of the target chat message as a protected content in response to receiving a protection setting instruction for the target chat message.

In practical implementation, the message input mode is a normal mode when the privacy protection control is off. A target chat message transmitted in this mode is a normal chat message, namely the target chat message may be shared normally. The user may set a normal chat message as a protected content by triggering a protection setting instruction. For example, referring to FIG. 16, when the target chat message is a chat message 1601, and a long-press operation performed on the chat message 1601 is received, a toolbar corresponding to the chat message 1601 is displayed, including a privacy protection button 1602. When a tap operation performed on the privacy protection button is received, the chat message 1601 is set as a protected content, and a protection identifier 1603 is displayed next to the chat message to indicate that the chat message is a protected content.

Figure 20:
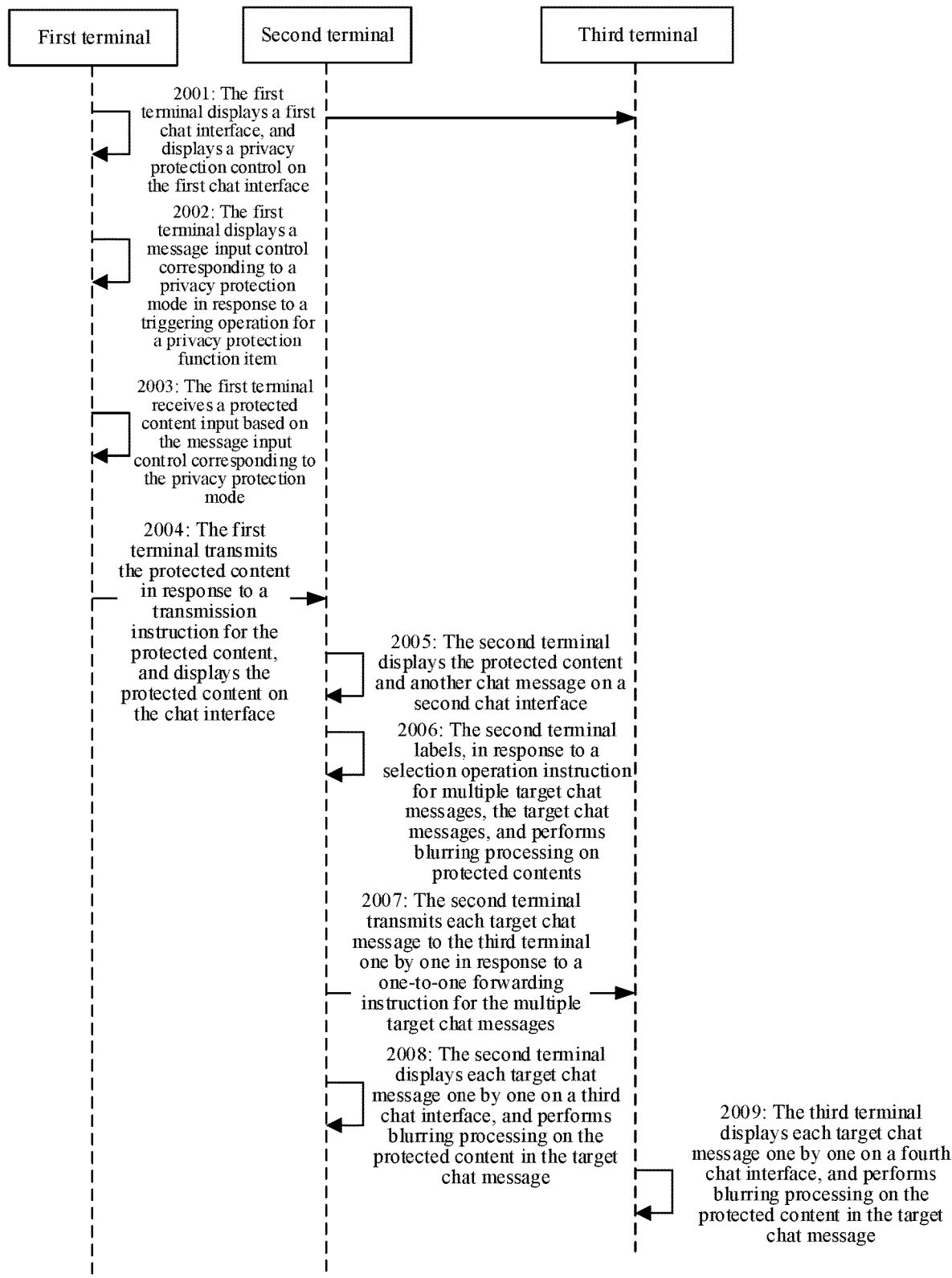
FIG. 20 is a schematic flowchart of an example message processing method according to an embodiment of this disclosure.

FIG. 20 is a schematic flowchart of a message processing method according to an embodiment of this disclosure. Referring to FIG. 20, the message processing method is implemented collaboratively by a first terminal, a second terminal, and a third terminal. The message processing method includes the following steps.

Step 2001: The first terminal displays a first chat interface, and displays a privacy protection control on the first chat interface.

The first chat interface is a chat interface where a user object of the first terminal conducts a chat with a user object of the second terminal.

Step 2002: The first terminal displays a message input control corresponding to a privacy protection mode in response to a triggering operation performed on the privacy protection control.

Step 2003: The first terminal receives a protected content input based on the message input control corresponding to the privacy protection mode.

Step 2004: The first terminal transmits the protected content in response to a transmission instruction for the protected content, and displays the protected content on the chat interface.

Step 2005: The second terminal displays the protected content and another chat message on a second chat interface.

The second chat interface is a chat interface where the user object of the second terminal conducts a chat with the user object of the first terminal.

Step 2006: The second terminal labels, in response to a selection operation instruction for multiple target chat messages, the target chat messages, and performs blurring processing on protected contents.

Step 2007: The second terminal transmits each target chat message to the third terminal one by one in response to a one-to-one forwarding instruction for the multiple target chat messages.

Step 2008: The second terminal displays each target chat message one by one on a third chat interface, and performs blurring processing on the protected content in the target chat message.

The third chat interface is a chat interface where the user object of the second terminal conducts a chat with a user object of the third terminal.

Step 2009: The third terminal displays each target chat message one by one on a fourth chat interface, and performs blurring processing on the protected content in the target chat message.

The fourth chat interface is a chat interface where the user object of the third terminal conducts a chat with the user object of the second terminal.

When a target chat message including a protected content is shared, protection processing is performed on the protected content, so that the protected content may be prevented from being spread and leaked, and the security of the protected content may be improved.

The following describes an example application. In practical implementation, a message transmitter may set a transmitted message, for example, setting it as a protected content. When sharing the protected content to another user object by screen capturing, editing, direct forwarding, etc., a message receiver performs protection processing, such as blurring processing, on the protected content to prevent the protected content from being shared to another object.

A message publisher will first be described. The message publisher may select a "privacy protection" mode when publishing a message (including a text message, a voice-to-text message, and a picture message) to edit and transmit the message. Alternatively, the message publisher edits, after publishing a message (including a text message, a voice-to-text message, and a picture message), the transmitted message to prevent the message from being captured and leaked.

As an example, referring to FIG. 15, a privacy protection control 1501 is displayed on the chat interface. When a tap operation performed on the privacy protection control 1501 is received, a privacy protection mode is entered, and a chat message input at this time is a protected content. When a transmission instruction for the input protected content is received, the protected content is transmitted, the protected content 1502 is displayed the chat interface, and moreover, identification information 1503 is displayed next to the chat message, the identification information being used for indicating that the corresponding chat message is a protected content.

As an example, referring to FIG. 16, multiple chat messages are displayed on the chat interface, including a received chat message and a transmitted chat message. For the transmitted chat message, such as a chat message 1601, when a long-press operation performed on the chat message 1601 is received, a toolbar corresponding to the chat message 1601 is displayed, including a privacy protection button 1602. When a tap operation performed on the privacy protection button is received, the chat message 1601 is set as a protected content, and a protection identifier 1603 is displayed next to the chat message to indicate that the chat message is a protected content.

A message receiving end will then be described. In some examples, the message receiving end may share a received chat message in the following two manners.

In some embodiments, the terminal may share the chat message by capturing, editing, and forwarding the chat interface. For example, the terminal displays a chat interface including multiple chat messages, the chat interface including a protected content 501. When receiving a target operation instruction for instructing screen capturing (screen capturing operation) is received, the terminal displays a screenshot image including the protected content 501, and performs protection processing on the protected content 502 in the screenshot image, such as blocking the protected content.

In some embodiments, multiple chat messages may be selected to be forwarded on the chat interface, to implement sharing of the chat messages. Forwarding may be forwarding the multiple chat messages one by one, or forwarding the multiple chat messages after merging.

As an example, taking forwarding one by one as an example, referring to FIG. 10, a selection operation performed on multiple target chat messages is received on the chat interface, and the selected multiple target chat messages are labeled. When a tap operation performed on a sharing button 1001 is received, multiple user objects are displayed. The user may select one from the multiple user objects as a receiver of the target chat messages. Each target chat message is transmitted to a terminal of the receiver one by one. Each chat message whose protected content is hidden is displayed on a chat interface for a chat with the receiver.

As an example, taking merging forwarding as an example, referring to FIG. 8, a selection operation performed on multiple target chat messages is received on the chat interface, and the selected multiple target chat messages are labeled. When a tap operation performed on a sharing button 801 is received, multiple user objects are displayed. The user may select one from the multiple user objects as a receiver of the target chat messages. The multiple target chat messages are merged into one chat message for transmission to a terminal of the selected receiver. The chat message 802 is displayed on a chat interface for a chat with the receiver. A protected content in the chat message is hidden.

It is to be noted that the message processing method may be applied to a mobile terminal or a computer terminal. Application to the computer terminal is described herein.

Referring to FIG. 17, multiple chat messages are displayed on the chat interface, including a received chat message and a transmitted chat message. For the transmitted chat message, such as a chat message 1701, when the user triggers a tap operation performed on the chat message 1701 through a right mouse button, a toolbar corresponding to the chat message 1701 is displayed, including a privacy protection button 1702. When the user receives a click operation performed on the privacy protection button through the left mouse button, the chat message 1701 is set as protected content, and a protection identifier 1703 is displayed next to the chat message to indicate that the chat message is protected content.

Referring to FIG. 6, a screen capturing state is entered when a tap operation performed on a screen capturing button 601 is received. After the screen capturing state is entered, hiding processing is performed on a protected content 602 on a chat interface to hide the protected content 602 on the chat interface. When receiving a region selection operation, the terminal determines a chat message in a screen capturing region corresponding to the region selection operation as a target chat message, the screen capturing region including the protected content 602 subjected to hiding processing. When a screen capturing confirmation operation is received, screen capturing processing is performed on the selected screen capturing region to obtain a screenshot image including the protected content 602 subjected to hiding processing. The protected content 602 in the screenshot image is hidden.

Referring to FIG. 11, a selection operation performed on multiple target chat messages is received on the chat interface, the selected multiple target chat messages are labeled, and a one-by-one forwarding button 1101 and a merging forwarding button 1102 are displayed. When receiving a tap operation performed on a sharing button 1101, the terminal displays multiple user objects. The user may select one from the multiple user objects as a receiver of the target chat messages. Each target chat message is transmitted to a terminal of the receiver one by one. Each chat message 1103 whose protected content is hidden is displayed on a chat interface for a chat with the receiver.

Technical side implementation of the message processing method provided in the embodiments of this disclosure will be described below.

Figure 21:
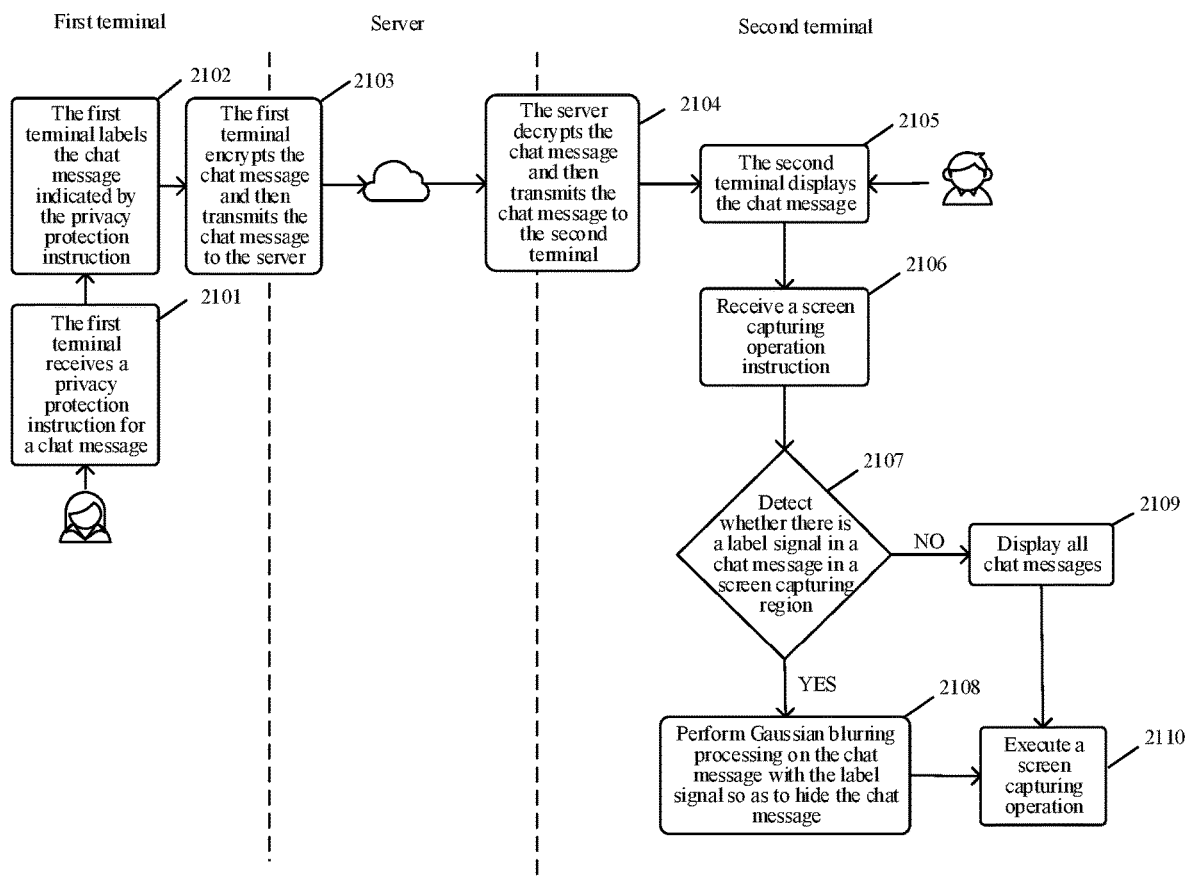
FIG. 21 is a schematic flowchart of an example message processing method according to an embodiment of this disclosure.

Taking a screen capturing scenario as an example, FIG. 21 is a schematic flowchart of a message processing method according to an embodiment of this disclosure. Referring to FIG. 21, the message processing method includes:

Step 2101: A first terminal receives a privacy protection instruction for a chat message.

Step 2102: The first terminal labels the chat message indicated by the privacy protection instruction.

Step 2103: The first terminal encrypts the chat message and then transmits the chat message to a server.

Step 2104: The server decrypts the chat message and then transmits the chat message to a second terminal.

Step 2105: The second terminal displays the chat message.

The chat message includes a text message, a picture message, a voice message, etc.

Step 2106: The second terminal receives a screen capturing operation instruction.

Step 2107: The second terminal detects whether there is a label signal in a chat message in a screen capturing region. If YES, step 2108 is performed. Otherwise, step 2109 is performed.

Step 2108: The second terminal performs Gaussian blurring processing on the chat message with the label signal so as to hide the chat message.

A visual processing range is within an information carrier box. For example, a Gaussian blurring value is set to 18.

When the chat message is a voice message, Gaussian blurring processing may be performed on a text content obtained by voice-to-text processing.

It is to be noted that In addition to hiding a protected content by Gaussian blurring processing, the protected content may be blocked by a dynamic or static image, such as a mosaic, an interesting map, or an interesting dynamic special effect (such as a special effect in incineration).

Step 2109: The second terminal displays all chat messages.

Step 2110: The second terminal executes a screen capturing operation.

Figure 22:
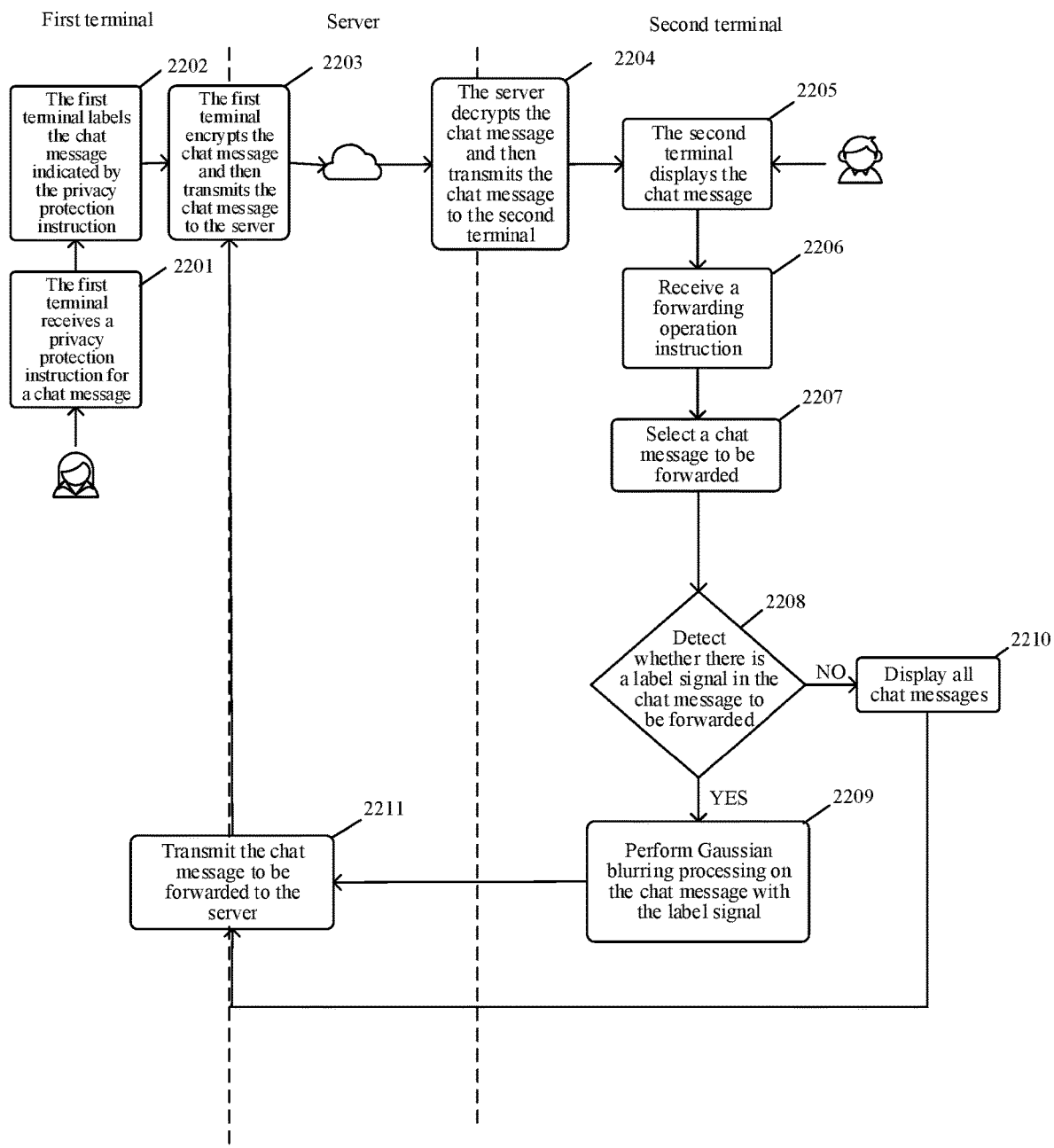
FIG. 22 is a schematic flowchart of an example message processing method according to an embodiment of this disclosure.

Taking a chat message forwarding scenario as an example, FIG. 22 is a schematic flowchart of a message processing method according to an embodiment of this disclosure. Referring to FIG. 22, the message processing method includes:

Step 2201: A first terminal receives a privacy protection instruction for a chat message.

Step 2202: The first terminal labels the chat message indicated by the privacy protection instruction.

Step 2203: The first terminal encrypts the chat message and then transmits the chat message to a server.

Step 2204: The server decrypts the chat message and then transmits the chat message to a second terminal.

Step 2205: The second terminal displays the chat message.

The chat message includes a text message, a picture message, a voice message, etc.

Step 2206: The second terminal receives a forwarding operation instruction.

Step 2207: The second terminal selects a chat message to be forwarded.

Step 2208: The second terminal detects whether there is a label signal in the chat message to be forwarded. If YES, step 2209 is performed. Otherwise, step 2210 is performed.

Step 2209: The second terminal performs Gaussian blurring processing on the chat message with the label signal so as to hide the chat message.

Step 2210: The second terminal displays all chat messages.

Step 2211: The second terminal transmits the chat message to be forwarded to a server.

A user may set a protected content to prevent information that is not desired to be disclosed or uncertain whether there is risk from being spread and leaked, so as to further improve a trust degree in communication and enable the user to chat more freely.

An example structure of a message processing apparatus 555 implemented as software modules in the embodiments of this disclosure will then be described. In some embodiments, as shown in FIG. 2, the message processing apparatus 555 stored in a memory 550 may include the following software modules:

a display module 5551, configured to display a chat interface including at least one chat message;

a receiving module 5552, configured to receive a target operation instruction on the chat interface, the target operation instruction being used for instructing a target operation to be executed on a target chat message, and the target operation being used for sharing the target chat message; and a processing module 5553, configured to execute the target operation on the target chat message in response to the target operation instruction, and perform, when the target chat message includes a protected content, protection processing on the protected content in an execution result of the target chat message.

In some embodiments, the processing module 5553 is further configured to: forward, in response to the target operation instruction when the target operation is a forwarding operation, the target chat message to a target object indicated by the forwarding operation instruction; and display the target chat message on a chat interface for a chat with the target object when the target chat message includes the protected content, and perform protection processing on the protected content in the target chat message.

In some embodiments, the processing module 5553 is further configured to: perform, in response to the target operation instruction when the target operation is a screen capturing operation, screen capturing processing on a region including the target chat message to obtain a screenshot image including the target chat message; and perform protection processing on the protected content in the screenshot image when the target chat message includes the protected content, and display a processed screenshot image.

In some embodiments, the processing module 5553 is further configured to: label the target chat message on the chat interface in response to the target operation instruction when the target operation is a selection operation performed on the target chat message; and perform protection processing on the protected content in the labeled target chat message on the chat interface when the target chat message includes the protected content.

In some embodiments, the processing module 5553 is further configured to: merge, in response to a merging transmission instruction for the labeled target chat message when there are at least two target chat messages, the at least two target chat messages into a merged chat message, and transmit the merged chat message; and display the merged chat message on a chat interface corresponding to the merging transmission instruction, and perform protection processing on a protected content in each target chat message in the merged chat message.

In some embodiments, the processing module 5553 is further configured to: transmit, in response to a one-by-one transmission instruction for the target chat messages when there are at least two target chat messages, each target chat message one by one; and display each target chat message one by one on a chat interface corresponding to the one-by-one transmission instruction, and perform protection processing on the corresponding protected content in each target chat message.

In some embodiments, the display module 5551 is further configured to display, in the correlated region of a chat message including a protected content on the chat interface, a protection identifier corresponding to the chat message, the protection identifier being used for indicating that the chat message includes the protected content.

The processing module 5553 is further configured to perform hiding processing on the target chat message in the execution result of the target chat message when a protection identifier corresponding to the target chat message is displayed in the correlated region of the target chat message.

In some embodiments, the processing module 5553 is further configured to add, when the target chat message includes the protected content, a static or dynamic target image to a position of the protected content in the execution result of the target chat message, such that the protected content is overlaid with the target image.

In some embodiments, the processing module 5553 is further configured to perform, when the target chat message includes the protected content, blurring processing on the protected content in the execution result of the target chat message, such that the protected content is blocked.

In some embodiments, the processing module 5553 is further configured to delete the protected content from the execution result of the target chat message to perform protection processing on the protected content when the target chat message includes the protected content.

In some embodiments, the processing module 5553 is further configured to display prompt information in response to a forwarding operation performed on the execution result, the prompt information being used for indicating that the protected content is non-forwardable.

In some embodiments, the display module 5551 is further configured to display, when the target chat message is a voice message, a text content corresponding to the voice message in response to a text viewing instruction for the voice message.

The processing module 5553 is further configured to: perform, in response to the target operation instruction when the target operation is a screen capturing operation, screen capturing processing on a region including the text content to obtain a screenshot image including the text content; and perform protection processing on the text content in the screenshot image when the voice message includes the protected content.

In some embodiments, the processing module 5553 is further configured to: receive a chat message including a protected content, and display the received chat message, the protected content in the chat message being subjected to protection processing;

transmit a viewing request to an original transmitting end of the chat message in response to a viewing operation performed on the protected content; and obtain, when the original transmitting end triggers an agree-to-view instruction, the protected content transmitted by the original transmitting end and not subjected to protection processing, and display the protected content not subjected to protection processing.

In some embodiments, the processing module 5553 is further configured to display a privacy protection control on the chat interface, display a message input control corresponding to a privacy protection mode in response to a triggering operation performed on the privacy protection control, receive the protected content input based on the message input control corresponding to the privacy protection mode, transmit the protected content in response to a transmission instruction for the protected content, and display the protected content on the chat interface, protection processing being performed on the protected content in an execution result of the protected content when a target operation instruction for instructing a target operation to be executed on the protected content is triggered at a receiving end.

In some embodiments, the processing module 5553 is further configured to receive a protection setting instruction for at least one chat message on the chat interface, and set the at least one chat message as a protected content in response to the protection setting instruction, so as to perform protection processing on the protected content in an execution result of the protected content when a target operation instruction for instructing a target operation to be executed on the protected content is triggered at a receiving end.

In some embodiments, the processing module 5553 is further configured to receive a protection setting instruction for a partial content in a chat message on the chat interface, and determine the partial content indicated by the protection setting instruction in the chat message as a protected content in response to the protection setting instruction, so as to perform protection processing on the protected content in an execution result of the chat message when a target operation instruction for instructing a target operation to be executed on the chat message is triggered at a receiving end.

In some embodiments, the processing module 5553 is further configured to transmit sharing prompt information to a transmitting end of the target chat message, the sharing prompt information being used for prompting that the target chat message is shared after protection processing is performed on the protected content in the target chat message.

The embodiments of this disclosure provide a message processing apparatus, including:

a display module, configured to display a privacy protection control on a chat interface; and a first transmission module, configured to set, in response to a transmission instruction for a target chat message when the privacy protection control is on, the target chat message as a protected content, and transmit the target chat message; and a second transmission module, configured to transmit, in response to a transmission instruction for a target chat message when the privacy protection control is off, the target chat message, display the target chat message on the chat interface, and set the target chat message as a protected content in response to receiving a protection setting instruction for the target chat message, protection processing being performed on the protected content when a target operation instruction for instructing a target operation to be executed on the protected content is triggered at a receiving end.

The embodiments of this disclosure provide a computer program product or a computer program, including computer instructions, the computer instructions being stored in a non-transitory computer-readable storage medium. A processor of a computer device reads the computer instructions from the non-transitory computer-readable storage medium, and executes the computer instructions, causing the computer device to perform the message processing method according to the embodiments of this disclosure.

The embodiments of this disclosure provide a non-transitory computer-readable storage medium storing executable instructions, the executable instructions, when executed by a processor, causing the processor to perform the method provided in the embodiments of this disclosure, such as the method shown in FIG. 3.

In some embodiments, the non-transitory computer-readable storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the executable instructions may be written in any form of programming language (including a compiled or interpreted language, or a declarative or procedural language) by using the form of a program, software, a software module, a script or a code, and may be deployed in any form, including being deployed as an independent program or being deployed as a module, a component, a subroutine, or another unit suitable for use in a computing environment.

As an example, the executable instructions may, but do not necessarily, correspond to a file in a file system, and may be stored in a part of a file that saves another program or data, for example, be stored in one or more scripts in a hypertext markup language (HTML) file, stored in a single file that is specially used for a discussed program, or stored in a plurality of collaborative files (for example, be stored in files of one or modules, subprograms, or code parts).

As an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely embodiments of this disclosure and are not intended to limit the protection scope of this disclosure. Any modification, equivalent replacement, and improvement made without departing from the spirit and scope of this disclosure shall fall within the protection scope of this disclosure.

What is claimed is:

1. A message processing method comprising:
   displaying a chat interface comprising at least one exchanged chat message;
   receiving, via the chat interface, a target operation instruction that indicates a target operation used for sharing a target chat message;
   executing the target operation on the target chat message in response to the target operation instruction;
   performing, when the target chat message comprises a protected content, protection processing on the protected content;
   receiving, via the chat interface, a viewing request comprising an identifier of a user requesting to view the protected content;
   determining whether an agree-to-view instruction is triggered in response to the viewing request received via the chat interface;
   if the agree-to-view instruction is triggered, transmitting, and displaying on the chat interface, the protected content not subjected to the protection processing; and
   if the agree-to-view instruction is not triggered, transmitting, and displaying on the chat interface, prompt information that the protected content is not viewable.

2. The method according to claim 1, wherein the executing the target operation further comprises:
   forwarding, when the target operation is a forwarding operation, the target chat message to a target object indicated by the target operation instruction; and
   the method further comprising:
      displaying, if the agree-to-view instruction is triggered, the target chat message on a target object chat interface when the target chat message comprises the protected content.

3. The method according to claim 1, wherein the executing the target operation further comprises:
   capturing, when the target operation is a screen capturing operation, a screen capture of a region comprising the target chat message;
   determining a chat message in the screen capturing region as the target chat message;

detecting whether the target chat message includes the protected content to determine a detection result; and wherein the performing the protection processing further comprises:

if the detection result indicates that the target chat message includes the protected content, performing the protection processing on the protected content in the screen capture and displaying a processed screen capture; and if the detection result indicates that the target chat message does not include the protected content, displaying the screen capture.

4. The method according to claim 1, wherein the executing the target operation further comprises:

labeling, when the target operation is a selection operation, the target chat message on the chat interface; and wherein the performing the protection processing further comprises:

performing the protection processing on the protected content in the labeled target chat message.

5. The method according to claim 4, the method further comprising:

merging, in response to a merging transmission instruction, an at least two target chat messages into a merged chat message;

transmitting the merged chat message;

displaying the merged chat message on a chat interface corresponding to the merging transmission instruction; and performing the protection processing on the protected content in each of the at least two target chat messages in the merged chat message.

6. The method according to claim 4, the method further comprising:

transmitting, in response to a one-by-one transmission instruction, each of an at least two target chat messages sequentially;

displaying each of the at least two target chat messages sequentially on a chat interface; and performing the protection processing on the corresponding protected content in each of the at least two target chat messages.

7. The method according to claim 1, wherein the method further comprises:

displaying, in a correlated region of a chat message comprising the protected content, a protection identifier, wherein the protection identifier indicates that the chat message comprises the protected content; and wherein the performing the protection processing further comprises:

performing the protection processing on the target chat message when the protection identifier corresponding to the target chat message is displayed in the correlated region of the target chat message.

8. The method according to claim 1, wherein the performing the protection processing further comprises:

adding a static or a dynamic target image to a position such that the protected content is overlaid with the target image.

9. The method according to claim 1, wherein the performing the protection processing further comprises:

performing blurring processing on the protected content such that the protected content is blocked.

10. The method according to claim 1, wherein the performing protection processing further comprises:

deleting the protected content from the target chat message.

11. The method according to claim 1, the method further comprising:

displaying prompt information in response to a forwarding operation, wherein the prompt information indicates that the protected content is non-forwardable.

12. The method according to claim 1, the method further comprising:

displaying, when the target chat message is a voice message, a text content corresponding to the voice message in response to a text viewing instruction;

wherein the executing the target operation further comprises:

capturing, when the target operation is a screen capturing operation, a screen capture of a region comprising the text content; and wherein the performing protection processing further comprises:

performing the protection processing on the text content in the screen capture when the voice message comprises the protected content.

13. The method according to claim 1, the method further comprising:

receiving a chat message comprising the protected content;

performing the protection processing on the protected content of the received chat message;

displaying the received chat message;

transmitting a viewing request to an original transmitter of the chat message in response to a viewing operation;

obtaining, when the original transmitter provides an agree-to-view instruction, the protected content not subjected to the protection processing; and displaying the protected content not subjected to the protection processing.

14. The method according to claim 1, the method further comprising:

displaying a privacy protection control on the chat interface;

displaying a message input control corresponding to a privacy protection mode in response to a triggering operation;

receiving a protected content input based on the message input control corresponding to the privacy protection control;

transmitting the protected content in response to a transmission instruction;

displaying the protected content on the chat interface; and performing the protection processing on the protected content when the target operation instruction is triggered at a receiving end.

15. The method according to claim 1, the method further comprising:

receiving a protection setting instruction for at least one chat message on the chat interface; and setting the at least one chat message as the protected content in response to the protection setting instruction to trigger the performing protection processing on the protected content when the target operation instruction is triggered at a receiving end.

16. The method according to claim 1, wherein the method further comprises:

receiving a protection setting instruction for a partial content in a chat message on the chat interface; and setting the partial content in the chat message as the protected content in response to the protection setting instruction to trigger the performing protection processing on the protected content when the target operation instruction is triggered at a receiving end.

17. A message processing method comprising:
displaying a privacy protection control on a chat interface comprising at least one exchanged chat message;
when the privacy protection control is on and in response to a transmission instruction, setting a content of a target chat message as a protected content and performing protection processing on the protected content;
transmitting the target chat message;
displaying the target chat message on the chat interface;
determining whether a target operation instruction is received from a receiving user via the chat interface; and
when the target operation instruction is received, performing protection processing on the protected content;
receiving, via the chat interface, a viewing request comprising an identifier of a user requesting to view the protected content;
determining whether an agree-to-view instruction is triggered in response to the viewing request received via the chat interface;
if the agree-to-view instruction is triggered, transmitting, and displaying on the chat interface, the protected content not subjected to the protection processing; and
if the agree-to-view instruction is not triggered, transmitting, and displaying on the chat interface, prompt information that the protected content is not viewable.

18. A non-transitory computer-readable storage medium storing at least one instruction, at least one program, a code set, or an instruction set, the at least one instruction, the at least one program, the code set, or the instruction set being loaded and executed by at least one processor, causing the at least one processor to perform a message processing method comprising:
displaying a chat interface comprising at least one exchanged chat message;
receiving, via the chat interface, a target operation instruction that indicates a target operation used for sharing a target chat message;
executing the target operation on the target chat message in response to the target operation instruction;
performing, when the target chat message comprises a protected content, protection processing on the protected content;
receiving, via the chat interface, a viewing request comprising an identifier of a user requesting to view the protected content;
determining whether an agree-to-view instruction is triggered in response to the viewing request received via the chat interface;
if the agree-to-view instruction is triggered, retransmitting, and displaying on the chat interface, the protected content not subjected to the protection processing; and
if the agree-to-view instruction is not triggered, transmitting, and displaying on the chat interface, prompt information that the protected content is not viewable.

19. The non-transitory computer-readable storage medium according to claim 18, the method further comprising:
forwarding, when the target operation is a forwarding operation, the target chat message to a target object indicated by the target operation instruction; and
the method comprising:
displaying, if the agree-to-view instruction is triggered, the target chat message on a target object chat interface when the target chat message comprises the protected content.

20. The non-transitory computer-readable storage medium according to claim 18, the method further comprising:
displaying, in a correlated region of a chat message comprising the protected content, a protection identifier, wherein the protection identifier indicates that the chat message comprises the protected content; and
wherein the performing the protection processing further comprises:
performing protection processing on the target chat message when the protection identifier corresponding to the target chat message is displayed in the correlated region of the target chat message.

* * * * *